United States Patent
Yu et al.

(10) Patent No.: US 10,827,078 B2
(45) Date of Patent: Nov. 3, 2020

(54) TRAFFIC PACKAGE PROVIDING METHOD AND RELATED DEVICE

(71) Applicant: Huawei Technologies Co., Ltd., Shenzhen (CN)

(72) Inventors: Xiaobo Yu, Shenzhen (CN); Shuiping Long, Beijing (CN); Qiang Yi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/093,872

(22) PCT Filed: Apr. 27, 2016

(86) PCT No.: PCT/CN2016/080353
§ 371 (c)(1),
(2) Date: Oct. 15, 2018

(87) PCT Pub. No.: WO2017/185255
PCT Pub. Date: Nov. 2, 2017

(65) Prior Publication Data
US 2019/0109948 A1    Apr. 11, 2019

(51) Int. Cl.
*H04W 4/60*     (2018.01)
*H04M 15/00*    (2006.01)
(Continued)

(52) U.S. Cl.
CPC ............ *H04M 15/49* (2013.01); *H04L 12/14* (2013.01); *H04M 15/00* (2013.01);
(Continued)

(58) Field of Classification Search
CPC .. H04M 15/49; H04M 15/751; H04M 15/705; H04M 15/00; H04M 15/8038;
(Continued)

(56) References Cited

U.S. PATENT DOCUMENTS 6,708,033 B1    3/2004  Linkola et al.
2002/0119766 A1  8/2002  Bianconi et al.
(Continued)

FOREIGN PATENT DOCUMENTS

CN    101610450 A    12/2009
CN    101827140 A    9/2010
(Continued)

OTHER PUBLICATIONS

Foreign Communication From a Counterpart Application, European Application No. 16899768.2, Extended European Search Report dated Mar. 13, 2019, 8 pages.
(Continued)

*Primary Examiner* — Lester G Kincaid
*Assistant Examiner* — Dung L Lam
(74) *Attorney, Agent, or Firm* — Conley Rose, P.C.

(57) ABSTRACT

A traffic package providing method and a related device, where the method includes obtaining, by a terminal device, travelling schedule information, sending the travelling schedule information to an access platform server, receiving information about multiple traffic packages from the access platform serve, where each of the N travelling schedule nodes corresponding to information about at least one traffic package in the information about the traffic packages, and the information about the traffic packages are provided by an operator, sending a traffic package subscription message to the access platform server, where the traffic package subscription message includes an identity of a determined target traffic package and identity information of the terminal, obtaining N profiles, and installing the N profiles.

16 Claims, 4 Drawing Sheets

(51) Int. Cl.
*H04W 4/24* (2018.01)
*H04L 12/14* (2006.01)
*H04W 8/20* (2009.01)
*H04W 4/50* (2018.01)

(52) U.S. Cl.
CPC ....... *H04M 15/705* (2013.01); *H04M 15/751* (2013.01); *H04M 15/8038* (2013.01); *H04W 4/24* (2013.01); *H04W 4/50* (2018.02); *H04W 4/60* (2018.02); *H04W 8/205* (2013.01)

(58) Field of Classification Search
CPC ........... H04W 4/24; H04W 4/60; H04W 4/50; H04W 8/205; H04L 12/14
See application file for complete search history.

(56) References Cited

U.S. PATENT DOCUMENTS

| | | | |
|---|---|---|---|
| 2009/0270069 A1* | 10/2009 | Plymoth | H04L 12/14 455/407 |
| 2010/0311404 A1* | 12/2010 | Shi | H04W 8/205 455/419 |
| 2010/0311444 A1 | 12/2010 | Shi et al. | |
| 2010/0311468 A1 | 12/2010 | Shi et al. | |
| 2015/0105080 A1 | 4/2015 | Jin | |
| 2015/0271662 A1* | 9/2015 | Lhamon | H04W 8/183 370/329 |
| 2015/0339748 A1 | 11/2015 | Huo et al. | |

FOREIGN PATENT DOCUMENTS

| | | | |
|---|---|---|---|
| CN | 102014367 | A | 4/2011 |
| CN | 102461271 | A | 5/2012 |
| CN | 103001834 | A | 3/2013 |
| CN | 103634791 | A | 3/2014 |
| CN | 104219647 | A | 12/2014 |
| CN | 104955019 | A | 9/2015 |
| CN | 105049219 | A | 11/2015 |
| EP | 2938106 | A1 | 10/2015 |
| JP | 2002503932 | A | 2/2002 |
| JP | 2012529858 | A | 11/2012 |
| KR | 20120021186 | A | 3/2012 |
| KR | 20140013102 | A | 2/2014 |

OTHER PUBLICATIONS

Machine Translation and Abstract of Chinese Publication No. CN101610450, Dec. 23, 2009, 16 pages.
Machine Translation and Abstract of Chinese Publication No. CN102014367, Apr. 13, 2011, 15 pages.
Foreign Communication From a Counterpart Application, PCT Application No. PCT/CN2016/080353, English Translation of International Search Report dated Jan. 18, 2017, 2 pages.
Foreign Communication From a Counterpart Application, PCT Application No. PCT/CN2016/080353, English Translation of Written Opinion dated Jan. 18, 2017, 7 pages.
Machine Translation and Abstract of Chinese Publication No. CN105049219, Nov. 11, 2015, 32 pages.
Foreign Communication From a Counterpart Application, Korean Application No. 10-2018-7031069, Korean Office Action dated Sep. 5, 2019, 5 pages.
Foreign Communication From a Counterpart Application, Korean Application No. 10-2018-7031069, English Translation of Korean Office Action dated Sep. 5, 2019, 3 pages.
Machine Translation and Abstract of Chinese Publication No. CN101827140, Sep. 8, 2010, 15 pages.
Machine Translation and Abstract of Chinese Publication No. CN102461271, May 16, 2012, 45 pages.
Machine Translation and Abstract of Chinese Publication No. CN103001834, Mar. 27, 2013, 11 pages.
Machine Translation and Abstract of Chinese Publication No. CN104955019, Sep. 30, 2015, 6 pages.
Machine Translation and Abstract of Japanese Publication No. JP2012529858, Nov. 22, 2012, 46 pages.
Foreign Communication From a Counterpart Application, Chinese Application No. 201680031998.9, Chinese Office Action dated Jul. 10, 2019, 14 pages.
Foreign Communication From a Counterpart Application, Japanese Application No. 2018-556407, Japanese Notice of Allowance dated Jul. 16, 2019, 3 pages.

* cited by examiner

TRAFFIC PACKAGE PROVIDING METHOD AND RELATED DEVICE

CROSS-REFERENCE TO RELATED APPLICATIONS

This application is a U.S. National Stage of International Patent Application No. PCT/CN2016/080353 filed on Apr. 27, 2016, which is hereby incorporated by reference in its entirety,

TECHNICAL FIELD

Embodiments of the present invention relate to the field of communications technologies, and more specifically, to a traffic package providing method and a related device.

BACKGROUND

A virtual subscriber identity module (English: Virtual Subscriber Identity Module, VSIM for short) service is a service for providing a terminal device with mobile network traffic outside a home country of the terminal device. By using the VSIM service, the terminal device can access a network outside the home country of the terminal device by using a mobile network, without a need of paying expensive roaming charges or purchasing a service of an operator in a destination. Specifically, a provider providing a VSIM service purchases traffic from an operator in a destination, divides the purchased traffic into traffic packages of different sizes, and provides the traffic packages for the terminal device used by a user. After the user arrives in a travelling schedule node, the terminal device downloads a profile (English: profile, also referred to as a user information set) provided by the operator in the destination, and installs the downloaded profile. The profile includes a file system, data, and an application. The data includes an integrated circuit card identifier (English: Integrate Circuit Card Identity, ICCID for short) of the profile, a profile name, an operator name, a profile nickname, an international mobile subscriber identity (English: International Mobile Subscriber Identification Number, IMSI for short), and an authentication key (English: Key Identifier, Ki for short). Optionally, the profile may further include a mobile station international ISDN number (English: Mobile Station International ISDN number, MSISDN for short).

Traffic packages in a VSIM service are obtained by means of division by a VSIM service provider. Some VSIM service providers may provide only one type of traffic package. For example, the traffic package is 10 CNY per day and includes 50 MB traffic, and a service is terminated if used traffic exceeds 50 MB. In this case, a user has to passively accept a traffic package obtained by means of division. In addition, a profit obtained by the VSIM service provider by performing secondary development on the purchased traffic from the operator in the destination does not belong to the operator in the destination. Therefore, the operator in the destination cannot obtain the corresponding profit. Moreover, because the VSIM service provider providing the VSIM service expects to obtain the profit produced by performing secondary development on the traffic, a price of the traffic package provided by the VSIM service provider is usually high.

SUMMARY

Embodiments of the present invention provide a traffic package providing method and a related device, so that an operator can directly provide traffic packages for a terminal device to select from.

According to a first aspect, an embodiment of the present invention provides a traffic package providing method. The method includes: obtaining, by a terminal device, travelling schedule information, where the travelling schedule information includes N travelling schedule nodes, N is a positive integer greater than or equal to 1, and the terminal device is a terminal device that supports an embedded universal integrated circuit card eUICC; sending the travelling schedule information to an access platform server; receiving information about multiple traffic packages that is sent by the access platform server, where each of the N travelling schedule nodes is corresponding to information about at least one traffic package in the information about the multiple traffic packages, and the information about the multiple traffic packages is provided by an operator; determining, from the multiple traffic packages, a target traffic package to be used by the terminal device in each of the N travelling schedule nodes; sending a traffic package subscription message to the access platform server, where the traffic package subscription message includes an identity of the determined target traffic package and identity information of the terminal; obtaining N profiles, where the N profiles are corresponding to the N travelling schedule nodes in a one-to-one manner; and installing the N profiles. In the method shown in FIG. 1, the access platform server may be implemented by a terminal vendor, an operator, or a third party. The access platform server may present traffic of multiple contracted operators to the terminal device, and interact with an application service on the terminal device to improve user experience and user stickiness. In addition, the terminal device can select an appropriate traffic package from at least one traffic package. Therefore, a user has more choices, thereby improving user experience. Moreover, because the terminal device supports the eUICC, after installing a profile, the terminal device can use a corresponding traffic package to use a network service, without a need of changing a SIM card. A possible result caused by changing the SIM card is avoided. For example, a replaced SIM card is lost, or an incorrect SIM card is substituted.

With reference to the first aspect, in a first possible implementation of the first aspect, before the determining, from the multiple traffic packages, a target traffic package to be used by the terminal device in each of the N travelling schedule nodes, the method further includes: obtaining traffic requirement information, where the traffic requirement information is used to indicate total traffic that needs to be used; and obtaining a network capability parameter of the operator that provides the multiple traffic packages; and the determining, from the multiple traffic packages, a target traffic package to be used by the terminal device in each of the N travelling schedule nodes includes: determining, from the multiple traffic packages, a traffic package matching a network capability parameter of the terminal device as a candidate traffic package; and determining, from the candidate traffic package, a candidate traffic package matching the traffic requirement information as the target traffic package. In this way, the terminal device can select an appropriate target traffic package according to traffic that needs to be used.

With reference to the first aspect, in a second possible implementation of the first aspect, the travelling schedule information further includes N travelling schedule times that are corresponding to the N travelling schedule nodes in a one-to-one manner, and before the determining, from the multiple traffic packages, a target traffic package to be used by the terminal device in each of the N travelling schedule nodes, the method further includes: obtaining traffic requirement information, where the traffic requirement information is used to indicate total traffic that needs to be used; and obtaining a network capability parameter of the operator that provides the multiple traffic packages; and the determining, from the multiple traffic packages, a target traffic package to be used by the terminal device in each of the N travelling schedule nodes includes: determining, from the multiple traffic packages, a traffic package matching a network capability parameter of the terminal device as a candidate traffic package; and determining, from the candidate traffic package, a candidate traffic package matching the traffic requirement information and the nth travelling schedule time as a target traffic package in the nth travelling schedule node, where n=1, . . . , N. In this way, the terminal device can select an appropriate target traffic package according to traffic that needs to be used and a quantity of days in which the traffic needs to be used. The target traffic package can meet a requirement of traffic that needs to be used by a user, and can also meet a requirement of a quantity of days in which the traffic needs to be used by the user.

According to a second aspect, an embodiment of the present invention provides a traffic package providing method. The method includes: receiving, by an access platform server, travelling schedule information sent by a terminal device, where the travelling schedule information includes N travelling schedule nodes, and N is a positive integer greater than or equal to 1; determining multiple traffic packages that are corresponding to the N travelling schedule nodes, where the multiple traffic packages are provided by an operator, and each of the multiple traffic packages is corresponding to at least one of the N travelling schedule nodes; sending information about the multiple traffic packages to the terminal device; receiving a traffic package subscription message sent by the terminal device, where the traffic package subscription message includes an identity of a target traffic package and identity information of the terminal device; obtaining, according to the identity of the target traffic package and the identity information of the terminal device, N profiles from the operator that provides the target traffic package, where the N profiles are corresponding to the N travelling schedule nodes in a one-to-one manner; and sending the N profiles to the terminal device. In the foregoing technical solution, the access platform server may present traffic of multiple contracted operators to the terminal device, and interact with an application service on the terminal device to improve user experience and user stickiness. In addition, the terminal device can select an appropriate traffic package from at least one traffic package. Therefore, a user has more choices, thereby improving user experience.

According to a third aspect, an embodiment of the present invention provides a terminal device. The terminal device includes a unit configured to execute the method provided in the first aspect.

According to a fourth aspect, an embodiment of the present invention provides a server. The server includes a unit configured to execute the method provided in the second aspect.

According to a fifth aspect, an embodiment of the present invention provides a terminal device. The terminal device includes an application processor, a communications circuit, and an eUICC. The application processor and the communications circuit are configured to execute the method provided in the first aspect.

According to a sixth aspect, an embodiment of the present invention provides a server. The server includes a processor, a transceiver circuit, and a memory. The processor, the transceiver circuit, and the memory are configured to execute the method provided in the second aspect.

According to a seventh aspect, an embodiment of the present invention provides a computer-readable storage medium. A program stored in the computer-readable storage medium includes an instruction used to execute the method provided in the first aspect.

According to an eighth aspect, an embodiment of the present invention provides a computer-readable storage medium. A program stored in the computer-readable storage medium includes an instruction used to execute the method provided in the second aspect.

According to a ninth aspect, an embodiment of the present invention provides a terminal device. The terminal device includes the computer-readable storage medium in the seventh aspect and a processor. The processor is configured to execute an instruction of a program stored in the computer-readable storage medium.

According to a tenth aspect, an embodiment of the present invention provides a server. The server includes the computer-readable storage medium in the eighth aspect and a processor. The processor is configured to execute an instruction of a program stored in the computer-readable storage medium.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
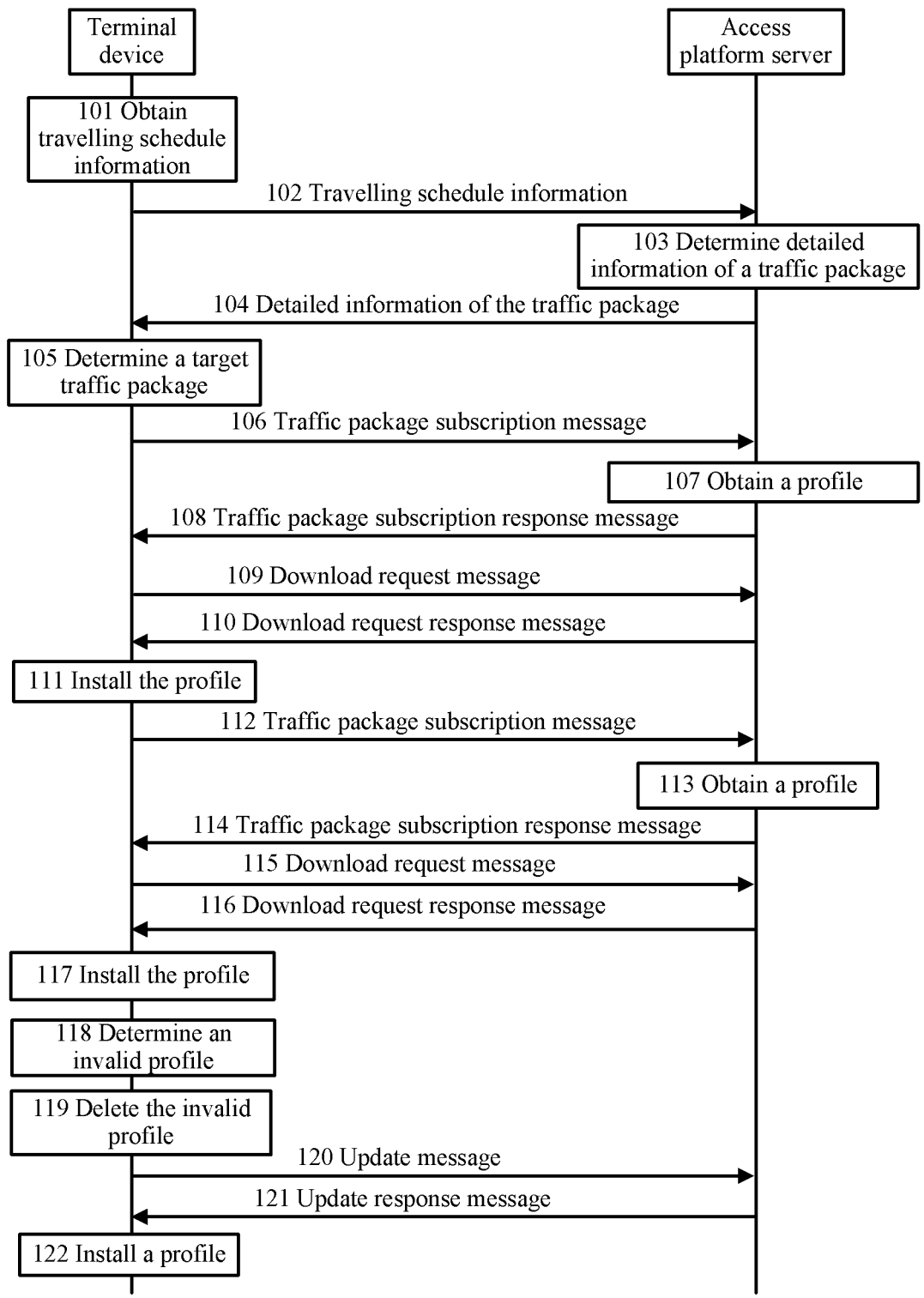
FIG. 1 is a schematic flowchart of a traffic package providing method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To help a person skilled in the art better understand the present invention, an embedded universal integrated circuit card (embedded Universal Integrated Circuit Card, eUICC for short) is first described.

In a mobile communications system, a smartcard is usually used to store information such as a user identity, a user authentication parameter and an algorithm, a phone book and SMS message data of a user, and a customization parameter of an operator, so as to implement portability of the user identity and data and implement differential customization among operators.

A universal integrated circuit card (Universal Integrated Circuit Card, UICC for short) is a removable smartcard. A user can conveniently transfer information stored in the UICC from a terminal to another terminal only by removing the UICC card from the terminal and inserting the UICC card into the another terminal. The UICC may include one or more logical modules, for example, a subscriber identity module (Subscriber Identity Module, SIM for short), a universal subscriber identity module (Universal Subscriber Identity Module, USIM for short), an IP multimedia services identity module (IP Multi Media Service Identity Module, ISIM for short), and other non-telecommunications application modules such as electronic signature authentication and a digital wallet. Different subscriber terminals may select and use corresponding logical modules according to types of radio access networks.

With rapid development of the Internet of Things, the International Organization for Standardization comes up with a requirement of the embedded universal integrated circuit card (embedded UICC, eUICC for short), to manage Internet of Things subscription more effectively and configure an Internet of Things terminal more flexibly and effectively. The eUICC is formed after the UICC is embedded into a terminal by means of packaging or welding. The eUICC is not easy to insert or remove, and unlike the UICC, the eUICC cannot be randomly replaced. Therefore, a risk of being stolen or being used for another purpose can be avoided. In addition, compared with another smartcard, the eUICC has a more reliable and more wear-resistant physical contact with the terminal, and has a longer service life and higher reliability, so that the eUICC can be used in a heavy bumping scenario.

In addition, at least one profile is usually installed on the eUICC. When the terminal is deployed in a location that is inconvenient for manually inserting the card or replacing the card, a user may remotely configure the eUICC, for example, remotely download, activate, deactivate, or delete a profile on the eUICC, so as to flexibly manage the smartcard.

The terminal device usually uses, in a form of pay-on-demand and/or a traffic package, a mobile network service provided by an operator. The pay-on-demand means that the terminal device pays according to usage of the service. For example, a mobile network fee is 0.3 CNY/MB. If traffic used by a mobile terminal is 10 MB, a fee of 3 CNY needs to be paid. The traffic package means that the terminal device can use a mobile network service of specific traffic in a specific time after paying a specific fee, instead of paying a fee according to used traffic. For example, the operator may provide the following traffic package: 500 MB, 30 CNY, one month. In this case, the terminal device needs only to pay 30 CNY to use traffic not exceeding 500 MB within one month. If traffic used by the terminal device in a validity time exceeds a total traffic of the traffic package, the terminal device may purchase a new traffic package or pay on demand. If the terminal device expects to still use the network service after the validity time expires, the terminal device may purchase a new traffic package. The operator usually provides a user with a validity time of a traffic package, total traffic of the traffic package, and a price of the traffic package. The user can select an appropriate traffic package according to an actual requirement. For ease of description, the validity time of the traffic package, the total traffic of the traffic package, and the price of the traffic package are collectively referred to as information about the traffic package in the following. In addition, to distinguish between different traffic packages, the operator may further allocate different identities to the different traffic packages. In this way, after determining a traffic package that the terminal device expects to use, the user may send, to the operator by using the terminal device, an identity of the determined traffic package that is to be used. Information about the traffic package may also include the identity of the traffic package.

It should be understood that the technical solutions of the embodiments of the present invention may be applied to various communications systems, such as a Global System for Mobile Communications (Global System of Mobile communication, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, LTE time division duplex (Time Division Duplex, "TDD" for short), and a Universal Mobile Telecommunications System (Universal Mobile Telecommunication System, "UMTS" for short).

A terminal device in the embodiments of the present invention is a terminal device with an eUICC. The terminal device mentioned in the embodiments of the present invention may also be referred to as a system, a subscriber unit, a subscriber station, a mobile site, a mobile station, a remote station, a remote terminal, a mobile device, a subscriber terminal, a mobile terminal, a wireless communications device, a subscriber agent, a subscriber apparatus, or user equipment (User Equipment, UE for short). For example, the terminal may be a cellular phone, a cordless phone, a Session Initiation Protocol (Session Initiation Protocol, SIP for short) phone, a wireless local loop (Wireless Local Loop, WLL for short) station, a personal digital assistant (Personal Digital Assistant, PDA for short), a handheld device, a computing device, a vehicular communications circuit, a smart meter, a smart home device, or another processing device connected to a wireless modem, where the handheld device, the computing device, the vehicular communications circuit, the smart meter, the smart home device, or the another processing device has a wireless communication function.

FIG. 1 is a schematic flowchart of a traffic package providing method according to an embodiment of the present invention.

101. A terminal device obtains travelling schedule information, where the travelling schedule information includes N travelling schedule nodes and N travelling schedule times, the N travelling schedule nodes are corresponding to the N travelling schedule times in a one-to-one manner, and N is a positive integer greater than or equal to 1.

The travelling schedule node mentioned in this embodiment of the present invention is a country or a region in which a user carrying the terminal device needs to use a network service. Herein, the region is a region to which a mobile country code (English: Mobile Country Code, MCC for short) is allocated, for example, Hong Kong or Taiwan. Therefore, different countries or regions have different MCCs.

Specifically, the travelling schedule information obtained by the terminal device may be manually entered by the user. For example, the user may enter the travelling schedule information described in Table 1.

TABLE 1

| Travelling schedule node | Travelling schedule time |
|---|---|
| France | 2016 Jan. 30-2016 Feb. 2 |
| Belgium | 2016 Feb. 2-2016 Feb. 8 |

The travelling schedule information may be entered by the user when the user expects to request to obtain a traffic package, or may be entered before the user requests to obtain a traffic package. For example, the user may enter the travelling schedule information into a schedule application on the terminal device. When the user expects to request to obtain a traffic package, the terminal device may read a schedule, obtain the travelling schedule information, and remind the user whether to request, according to the travelling schedule information, to obtain a traffic package.

It can be understood that when the user enters the travelling schedule information, the user may enter travelling schedule information, as described in Table 1, that includes a travelling schedule node and a travelling schedule time of each travelling schedule node, or may enter another type of travelling schedule plan. For example, the user may enter a name of a city (or a province or a state) in which the user expects to use a network service and a travelling schedule time in each city (or a province or a state). In this case, the terminal device may determine, according to the travelling schedule plan entered by the user, the travelling schedule information that includes a travelling schedule node and a travelling schedule time corresponding to each travelling schedule node. For example, the user may enter the following travelling schedule plan: Lyon, 2016.01.30-2016.02.01; Paris, 2016.02.01-2016.02.02; Brussels, 2016.02.02-2016.02.08. In this case, the terminal device may convert the travelling schedule plan into the travelling schedule information described in Table 1.

102. The terminal device sends the travelling schedule information to an access platform server.

Before sending the travelling schedule information to the access platform server, the terminal device may first establish a secure connection channel to the access platform server, for example, a Hypertext Transfer Protocol Secure (English: Hyper Text Transfer Protocol over Secure Socket Layer, HTTPS for short) channel. The terminal device sends the travelling schedule information to the access platform server by using the secure connection channel. In this way, secure transmission of the travelling schedule information can be ensured.

103. The access platform server determines information about M groups of traffic packages according to the N travelling schedule nodes in the travelling schedule information, where each of the N travelling schedule nodes is corresponding to information about at least one group of traffic package in the information about the M groups of traffic packages, and the information about the M groups of traffic packages is provided by an operator.

Specifically, the access platform server may reach an agreement in advance with an operator that is in a travelling schedule node and that can provide a traffic package service, so as to obtain information about a traffic package that can be provided by the operator in the travelling schedule node. For example, the access platform server may reach an agreement with one or more operators in France, and each operator can provide at least one type of traffic package. The access platform server may also reach an agreement with one or more operators in Belgium, and each operator can provide at least one type of traffic package. The access platform may obtain, from an operator in a destination, information about a traffic package, and store the information onto the access platform server. As described above, the information about the traffic package includes a validity time of the traffic package, total traffic of the traffic package, a price of the traffic package, and an identity of the traffic package. The identity of the traffic package may include an index value of the traffic package and a PLMN of an operator that provides a service for the traffic package. The PLMN includes an MCC and a mobile network code (English: Mobile Network Code, MNC for short). Each country or region has an independent MCC, and each operator has an MNC. For example, an MCC of China is 460, and an MNC of China Mobile is 01. Therefore, a PLMN of China Mobile is 46001. One operator may have multiple subnets. For example, Vodafone (English: Vodafone) has subnets in both Germany and the UK. In this way, Vodafone can provide a UK-Germany package. If the terminal device selects the UK-Germany traffic package, the terminal device can use the same traffic package in the UK and Germany. In this case, a PLMN of an operator that can provide a service for the traffic package should include PLMNs of Vodafone in Germany and the UK. For example, if Vodafone provides three UK-Germany traffic packages, identities of the three traffic packages may be 243152620201, 243152620202, and 243152620203, where 24315 is a PLMN of Vodafone in the UK, 26202 is a PLMN of Vodafone in Germany, and the last two digits of each identity indicate an index value used to distinguish between different traffic packages. Certainly, the identities of the traffic packages are merely examples. A person skilled in the art may understand that a PLMN in an identity of a traffic package may be located before an index value of the traffic package or may be located after an index value of the traffic package, and a quantity of digits in the index value of the traffic package may be set according to a requirement. The identity of the traffic package may further include a name and an identity of an operator. Certainly, the identity of the traffic package may be in another form, for example, may include a short name of a country or a region and the index value of the traffic package. Alternatively, the identity of the traffic package may be the index value of the traffic package. In this case, information about the traffic package may further include location information of the operator that provides the traffic package.

Table 2 schematically describes information about traffic packages that is stored on an access platform server.

TABLE 2

| Traffic package group number | Information about a traffic package | | | |
|---|---|---|---|---|
| | Identity of a traffic package | Total traffic of a traffic package | Validity time of a traffic package | Price of a traffic package |
| 1 | 2080101 | 50 MB | 5 days | 35 CNY |
| 1 | 2080102 | 100 MB | 8 days | 65 CNY |
| 1 | 2081001 | 30 MB | 5 days | 20 CNY |
| 1 | 2081002 | 100 MB | 10 days | 40 CNY |
| 2 | 2061001 | 50 MB | 5 days | 35 CNY |

TABLE 2-continued

| Traffic package group number | Identity of a traffic package | Total traffic of a traffic package | Validity time of a traffic package | Price of a traffic package |
|---|---|---|---|---|
| 2 | 2061002 | 100 MB | 7 days | 65 CNY |
| 3 | 2341501 | 50 MB | 5 days | 25 CNY |
| 3 | 2341502 | 100 MB | 7 days | 40 CNY |
| 3 | 2341503 | 200 MB | 5 days | 70 CNY |
| 4 | 234152620201 | 50 MB | 5 days | 35 CNY |
| 4 | 234152620202 | 100 MB | 7 days | 50 CNY |
| 4 | 234152620203 | 200 MB | 5 days | 80 CNY |

In the example described in Table 2, an identity of a traffic package is presented in a manner of a PLMN+ an index value, and more specifically, in a manner of an MCC+ an MNC+ an index value, where a quantity of PLMNs in the identity of the traffic package may be greater than 1. It can be learned that MCC values in information about different traffic packages in information about a same group of traffic packages are the same. For example, MCC values in identities of traffic packages in information about the first group of traffic packages are all 208. According to an MCC rule, 208 is an MCC of France. Therefore, the information about the first group of traffic packages is information about traffic packages in France. It is easily understood that the information about the traffic packages in France is provided by an operator in France, and the terminal device can select an appropriate traffic package to use, in France, a mobile network service provided by the operator in France. For another example, an identity of a traffic package in information about the fourth group of traffic packages includes 12 digits, where the first to the fifth digits indicate a first PLMN, the sixth to the tenth digits indicate a second PLMN, and the eleventh and the twelfth digits indicate an index value of the traffic package; and 24315 is the PLMN of Vodafone in the UK, and 26202 is the PLMN of Vodafone in Germany. Therefore, the information about the fourth group of traffic packages may be provided by Vodafone in the UK and/or France. The terminal device can use the traffic package to use, in the UK and/or France, a mobile network service provided by Vodafone.

After receiving the travelling schedule information sent by the terminal device, the access platform server may determine information about a corresponding traffic package according to a travelling schedule node in the travelling schedule information. Specifically, the access platform server may determine, according to an MCC in an identity of a traffic package in information about each group of traffic packages, a travelling schedule node corresponding to each group of traffic packages. Still using Table 1 and Table 2 as examples, the access platform server may determine, according to the travelling schedule nodes in Table 1, traffic packages required by the terminal device to use mobile network services in France and Belgium. In this case, the access platform server may determine that a traffic package group in which MCCs in an identity of a traffic package indicate France and Belgium needs to be provided. The access platform server may determine, according to Table 1 and Table 2, information about traffic packages required by the terminal device, as described in Table 3.

TABLE 3

| Traffic package group number | Identity of a traffic package | Total traffic of a traffic package | Validity time of a traffic package | Price of a traffic package |
|---|---|---|---|---|
| 1 | 2080101 | 50 MB | 5 days | 35 CNY |
|  | 2080102 | 100 MB | 8 days | 65 CNY |
|  | 2081001 | 30 MB | 5 days | 20 CNY |
|  | 2081002 | 100 MB | 10 days | 40 CNY |
| 2 | 2061001 | 50 MB | 5 days | 35 CNY |
|  | 2061002 | 100 MB | 7 days | 65 CNY |

It can be learned that in this embodiment, the travelling schedule information of the terminal device includes two travelling schedule nodes, and two groups of traffic packages in traffic packages obtained by the access platform server are corresponding to the travelling schedule nodes of the terminal. Therefore, values of M and N are the same in this embodiment. If the travelling schedule information of the terminal device further includes the UK, the access platform server may further send information about the third group and the fourth group of traffic packages to the terminal device. In this case, a value of M may be greater than N. Certainly, a value of M may be less than N in another embodiment. For example, an operator may provide short-term mobile network services in multiple countries. In this case, if the travelling schedule nodes of the terminal device are included in the multiple countries, the access platform server needs to provide information about only one group of traffic packages.

104. The access platform server sends the information about the M groups of traffic packages to the terminal device.

105. The terminal device determines, from at least M traffic packages, a target traffic package to be used by the terminal device in each of the N travelling schedule nodes.

The terminal device first needs to determine a correspondence between the information about the M groups of traffic packages and the N travelling schedule nodes. The terminal device may determine, from the information about the M groups of traffic packages and according to the N travelling schedule nodes, traffic package groups corresponding to the N travelling schedule nodes. More specifically, after determining a travelling schedule node, the terminal device may determine, according to an identity of a traffic package, a traffic package group corresponding to the travelling schedule node. For example, if the terminal device determines that the travelling schedule node is France, the terminal device may determine that information about a group to which a traffic package whose traffic package identity includes the MCC of France belongs is information about a group of traffic packages corresponding to the travelling schedule node. It can be understood that assuming that a group of traffic packages are traffic packages in the UK and Germany and another group of traffic packages are traffic packages in the UK, if the travelling schedule node of the terminal device is the UK, the terminal device may determine that information about two groups of traffic packages is corresponding to the travelling schedule node.

It can be learned that in step 103 to step 105, the information about the traffic packages that is determined by the access platform server is determined according to a group to which the traffic packages belong. Different traffic packages that belong to one group are corresponding to a same travelling schedule node. Traffic packages in different groups are corresponding to different travelling schedule nodes. Therefore, traffic packages are grouped according to a corresponding travelling schedule node, so that the access platform server stores the traffic packages by category. In addition, the access platform server may also directly find, by using grouping information, all traffic packages corresponding to a travelling schedule node. For example, as long as the access platform server determines that a travelling schedule node corresponding to one traffic package in a group of traffic packages belongs to the N travelling schedule nodes, the access platform server can determine that all traffic packages in the group of traffic packages are traffic packages corresponding to the travelling schedule node. Certainly, the access platform server may store traffic packages without grouping. In this case, the access platform server may directly determine multiple traffic packages that are corresponding to the N travelling schedule nodes, and send the multiple traffic packages to the terminal device. The terminal device determines, from the multiple traffic packages, a target traffic package that needs to be used in each travelling schedule node. Each of the multiple traffic packages is corresponding to at least one of the N travelling schedule nodes.

After determining the correspondence between the N travelling schedule nodes and the information about the M groups of traffic packages, the terminal device may determine the target traffic package that needs to be used in each travelling schedule node.

The terminal device may further obtain a network capability parameter of the operator that provides the traffic packages. The terminal device may determine whether a network capability parameter of the terminal device matches the network capability parameter of the operator that provides the traffic packages. If determining that the network capability parameter of the terminal device matches the network capability parameter of the operator that provides the traffic packages, the terminal device determines the target traffic package that needs to be used. In this way, a consequence that the terminal device cannot use a mobile network service provided by the operator because the network capability parameter of the terminal device does not match the network capability parameter of the operator is avoided.

The network capability parameter may include a network standard, such as GSM, LTE, or CDMA. The network capability parameter may further include other information, for example, a requirement for an operating frequency band of a corresponding standard, a requirement for a quantity of antennas of the corresponding standard, and whether carrier aggregation and multiple-input multiple-output (English: Multiple-Input Multiple-Output, MIMO for short) are supported. For example, the network capability parameter item of the operator that provides the traffic packages may include the following content: FDD-LTE, 1955-1980 MHz/2145-2170 MHz, information that carrier aggregation is supported, and information that MIMO is supported. If the terminal device supports FDD-LTE, an operating frequency band of the terminal device is 1955-1980 MHz/2145-2170 MHz, and the terminal device supports carrier aggregation and/or MIMO, the terminal device may select the target traffic package from traffic packages with the network capability parameter item. In addition, it can be understood that because of downward compatibility, if the terminal device does not support carrier aggregation and/or MIMO, but the terminal device supports FDD-LTE, and the operating frequency band of the terminal device is 1955-1980 MHz/2145-2170 MHz, the terminal device may also select the target traffic package from the traffic packages with the network capability parameter item.

Optionally, in an embodiment, the information about the traffic packages may further include the network capability parameter of the operator that provides the traffic packages. In this way, after obtaining the information about the traffic packages, the terminal device may determine, according to the network capability parameter of the terminal device, a candidate traffic package in information about each traffic package. Table 4 describes an example that a network capability parameter of an operator that provides a traffic package is included.

TABLE 4

| | Information about a traffic package | | | | |
|---|---|---|---|---|---|
| Travelling schedule node | Identity of a traffic package | Total traffic of a traffic package | Validity time of a traffic package | Price of a traffic package | Network capability parameter of an operator that provides a traffic package |
| 1 | 2080101 | 50 MB | 5 days | 35 CNY | GSM, LTE |
| | 2080102 | 100 MB | 8 days | 65 CNY | GSM, LTE |
| | 2081001 | 30 MB | 5 days | 20 CNY | WCDMA |
| | 2081002 | 100 MB | 10 days | 40 CNY | WCDMA |
| 2 | 2061001 | 50 MB | 5 days | 35 CNY | GSM, LTE |
| | 2061002 | 100 MB | 7 days | 65 CNY | GSM, LTE |

Optionally, in an embodiment, after determining a traffic package matching the network capability parameter of the terminal device as a candidate traffic package, the terminal device may determine the target traffic package from the candidate traffic package. Optionally, in an embodiment, the terminal device may directly determine, from the candidate traffic package, the target traffic package that needs to be used. For example, assuming that the travelling schedule information of the terminal device is the travelling schedule information described in Table 1, the terminal device receives information about two groups of traffic packages as described in Table 4, and the terminal device supports GSM and LTE, the terminal device may determine traffic packages for which a network capability parameter of an operator is GSM and LTE as candidate traffic packages. In this case, identities of candidate traffic packages in France are U.S. Pat. Nos. 2,080,101 and 2,080,102, and identities of candidate traffic packages in Belgium are U.S. Pat. Nos. 2,061,001 and 2,061,002. Then, the terminal device determines a traffic package in each travelling schedule node from the determined candidate traffic packages according to a travelling schedule time in the travelling schedule node. Still using Table 1 as an example, if determining that a stay time in France is 4 days, the terminal device determines a traffic package whose traffic package identity is 2080101 as a target traffic package in France; if determining that a stay time in Belgium is 7 days, the terminal device determines a traffic package whose traffic package identity is 6 as a target traffic package in Belgium. It can be understood that matching between the travelling schedule time and a validity time of a traffic package does not mean that two times are completely the same. Optionally, in an embodiment, a validity time of a matched target traffic package may be greater than or equal to a corresponding travelling schedule time. For example, if determining that a travelling schedule time in France is 6 days, the terminal device may determine a traffic package whose traffic package identity is 2080102 as the target traffic package, so that a user can go online by using a mobile network during the stay time in the travelling schedule node. Optionally, in another embodiment, a validity time of a matched target traffic package may be less than a corresponding travelling schedule time. For example, if determining that a travelling schedule time in France is 6 days, the terminal device may determine a traffic package whose traffic package identity is 2080101 as the target traffic package, to prevent a user from paying an extra fee. A manner of matching between the travelling schedule time and the validity time of the traffic package may be specified by the terminal device or the user, and is not limited in the present invention. Optionally, in another embodiment, the terminal device may determine, from the candidate traffic packages, at least two candidate target traffic packages for the user to select from. The terminal device obtains input that is used to select the target traffic package, and determines the target traffic package according to the input. In this way, the user can actively select the target traffic package that needs to be used.

Optionally, in another embodiment, the terminal device may further obtain traffic requirement information. The traffic requirement information is used to indicate total traffic that needs to be used by the terminal device in a first time period. The traffic requirement information may be obtained by the terminal device by collecting statistics on historical traffic used by the terminal device, or may be manually entered by a user. Optionally, the collecting statistics on historical traffic used by the terminal device may be collecting statistics on an average value of traffic used by the terminal device in the first time period during travelling (that is, the terminal device does not use a service provided by an operator in a country or a region in which the terminal device permanently resides), or may be collecting statistics on an average value of traffic used by the terminal device in the first time period in ordinary days. The first time period may be one day, two days, or one week, and is not limited in the present invention. The terminal device may determine, according to the network capability parameter of the terminal device, a candidate traffic package from information about each traffic package. Assuming that the terminal device supports GSM and LTE, the terminal device may determine traffic packages for which a network capability parameter of an operator is GSM and LTE as candidate traffic packages. Optionally, in an embodiment, the terminal device may directly determine, from the candidate traffic packages, the target traffic package that needs to be used. Still using Table 1 and Table 4 as examples, in this case, identities of candidate traffic packages in France are U.S. Pat. Nos. 2,080,101 and 2,080,102, and identities of candidate traffic packages in Belgium are U.S. Pat. Nos. 2,061, 001 and 2,061,002. Then, the terminal device determines, from the determined candidate traffic packages, a traffic package matching the traffic requirement information and the nth travelling schedule time as a target traffic package in the nth travelling schedule node. Still using Table 1 as an example, if determining that a stay time in France is 4 days and the traffic requirement information is 10 MB/day, the terminal device determines a traffic package whose traffic package identity is 2080101 as a target traffic package in France; if determining that a stay time in Belgium is 7 days and the traffic requirement information is 10 MB/day, the terminal device determines a traffic package whose traffic package identity is 2061002 as a target traffic package in Belgium. It can be understood that in some cases, no traffic package matching both the traffic requirement information and the travelling schedule time can be found. In this case, the traffic requirement information may be considered preferentially, to meet a traffic requirement. For example, still using Table 1 as an example, the stay time of the terminal device in France is 4 days, and the traffic requirement information is 20 MB/day. In this case, if the stay time is 4 days, total traffic required is 80 MB. Apparently, total traffic of a traffic package 1 cannot meet a traffic requirement. In this case, a traffic package whose traffic package identity is 208010 may be determined as the target traffic package. It can be understood that total traffic of the target traffic package may be greater than total traffic of the traffic requirement, to meet a traffic usage requirement. Certainly, to reduce fees, total traffic of the target traffic package may be not greater than a total traffic requirement. In this case, the travelling schedule time may be considered preferentially. Whether the traffic requirement information or the travelling schedule time has a higher priority may be specified by the terminal device or the user, and is not limited in the present invention. In the foregoing technical solution, when the target traffic package is determined, a habit of using data traffic by the terminal device is considered. Therefore, a consequence caused because total traffic of a selected target traffic package exceeds total traffic usually required by the terminal device can be avoided. For example, after using up the total traffic of the target traffic package, the terminal device may need to purchase an additional traffic package, or pay on demand. Optionally, in another embodiment, the terminal device may determine, from the candidate traffic packages, at least two candidate target traffic packages for the user to select from. The terminal device obtains input that is used to select the target traffic package, and determines the target traffic package according to the input. In this way, the user can actively select the target traffic package that needs to be used.

Optionally, in another embodiment, the terminal device may determine, according to the network capability parameter of the terminal device, a candidate traffic package from information about each traffic package. Assuming that the terminal device supports GSM and LTE, the terminal device may determine traffic packages for which a network capability parameter of an operator is GSM and LTE as candidate traffic packages. Still using Table 1 and Table 4 as examples, in this case, identities of candidate traffic packages in France are U.S. Pat. Nos. 2,080,101 and 2,080,102, and identities of candidate traffic packages in Belgium are U.S. Pat. Nos. 2,061,001 and 2,061,002. After the candidate traffic packages are determined, total traffic, validity times, and prices of the candidate traffic packages are presented in a display interface of the terminal device. The terminal device obtains first input. The first input is used to determine, from the candidate traffic packages, a target traffic package in the N travelling schedule nodes. The first input is an operation performed by a user on the terminal device. That is, the user may determine, from the presented candidate traffic packages, a traffic package to which the user expects to subscribe as the target traffic package. In this way, the user can select an appropriate traffic package according to a requirement.

Further, after N target traffic packages are determined, the terminal device may present, in the display interface, the determined N target traffic packages, and present a selection interface for prompting whether the N target traffic packages can be accepted. If the user determines to accept the N target traffic packages, the user selects positive input. When receiving the positive input, the terminal device determines that the user accepts the N target traffic packages. If the user determines not to accept the N target traffic packages, the user selects negative input. Optionally, the negative input may be used to indicate one or more target traffic packages that are not accepted by the user. In other words, the user may select, by using the negative input, the one or more target traffic packages that are not accepted. In this case, the terminal device may present all traffic packages in a travelling schedule node corresponding to the target traffic package that is not accepted, so that the user selects a new target traffic package. For example, a target traffic package corresponding to France is a traffic package whose identity is 2080101. If the user does not accept the traffic package as a target traffic package, the user may enter negative input that is used to select the traffic package. After obtaining the negative input, the terminal device presents, in the display interface, all traffic packages provided by all operators in France that reach an agreement with the access platform server (that is, all the traffic packages provided by the operators in France in Table 3). In this case, the user may select, from all the traffic packages, a traffic package as a target traffic package in France. Optionally, the negative input may be used to indicate that the user does not accept the N target traffic packages. In this case, the terminal device may present all traffic packages provided by operators in all travelling schedule nodes. The user may select, by using second input, a target traffic package that the user expects to use in each travelling schedule node.

Optionally, in another embodiment, the terminal device may obtain, in another manner, the network capability parameter of the operator that provides the traffic packages. For example, after a traffic package is determined, the terminal device may request, by using a request message, the access platform server to feed back a network capability parameter of an operator that provides the determined traffic package. If the network capability parameter of the terminal device matches the network capability parameter of the operator that provides the determined traffic package, the determined traffic package is determined as the target traffic package. If the network capability parameter of the terminal device does not match the network capability parameter of the operator that provides the determined traffic package, a target traffic package is determined again.

After the target traffic package is determined, the terminal device may notify the access platform server of the determined target traffic package, and may download a profile (that is, profile) corresponding to each target traffic package. A specific procedure may be implemented by using step 106 to step 111, or may be implemented by using step 112 to step 122.

106. The terminal device sends a traffic package subscription message to the access platform server, where the traffic package subscription message includes an identity of the determined target traffic package and identity information of the terminal device.

The identity information of the terminal device may be an international mobile equipment identity (English: International Mobile Equipment Identity, IMEI for short), or may be an eUICC identity (English: eUICC-identity, EID for short), or the like.

Optionally, after receiving the traffic package subscription message sent by the terminal device, the access platform server determines whether a traffic service can be provided for the terminal device. For example, after sending the traffic package subscription message, the terminal device pays a related fee for the target traffic package that is subscribed to. The access platform server receives fee payment information. In this case, after determining that the terminal device completes paying the fee, the access platform server determines to provide a traffic service for the terminal device. Specifically, the terminal device may pay the related fee for the target traffic package by means of an online bank or a credit card. After the terminal device completes paying the fee, the access platform server receives the fee payment information, transfers the received fee to a corresponding operator, and subscribes to a traffic package specified by the operator. Alternatively, the access platform server may determine, according to the identity information of the terminal device, whether the terminal device may be a postpaid user. If determining that the terminal device is a postpaid user, the access platform server may determine to provide a traffic service for the terminal device. After determining that a traffic service can be provided for the terminal device, the access platform server may start to obtain a profile corresponding to the determined target traffic package.

107. The access platform server obtains, according to the identity of the determined target traffic package, a profile corresponding to the identity of the determined target traffic package.

After receiving the identity of the determined target traffic package, the access platform server determines an operator corresponding to an identity of each target traffic package. The access platform server obtains, from the operator corresponding to the identity of each target traffic package, a profile corresponding to the identity of each target traffic package. If an identity of one target traffic package is corresponding to one travelling schedule node, the identity of the target traffic package is corresponding to one profile. If one target traffic package is corresponding to multiple travelling schedule nodes, each travelling schedule node has a profile. That is, if the travelling schedule information of the terminal device includes the N travelling schedule nodes, the access platform server obtains N profiles.

Specifically, the access platform server sends a profile download request to an operator server of the operator corresponding to each target traffic package. A related device of the operator prepares a corresponding profile for the terminal device, and sends the corresponding profile to the access platform server. Specifically, the profile download request sent to the operator server by the access platform server includes the identity information (such as the IMEI and/or the EID) of the terminal device and identity information of a traffic package that is selected by the terminal device and that is corresponding to the operator. The operator server allocates an international mobile subscriber identity (English: International Mobile Subscriber Identification Number, IMSI for short) to the terminal device, and determines a profile type (English: Profile Type) that needs to be allocated to the terminal device. The operator server sends a download request to a subscription manager-data preparation (English: Subscription Manager Data Preparation, SM-DP for short) network element of the operator. The download request includes the identity information of the terminal device, the IMSI allocated to the terminal device, the profile type allocated to the terminal device, a subscription manager-secure routing identity (English: Subscription Manager Secure Routing Identity, SR ID for short) of the operator, and the like. The SM-DP network element generates a corresponding profile for the terminal device according to content in the download request; determines, according to the SR ID, a subscription manager-secure routing (English: Subscription Manager Secure Routing, SM-SR for short) network element with which the current profile is registered; and sends a profile ready message to the SM-SR network element, where the profile ready message includes the identity information of the terminal device. The SM-DP network element generates key information of the profile, and sends the key information of the profile to the operator server. The operator server sends an agreement acknowledgement message to the service platform server, where the agreement acknowledgement message includes a secure routing uniform resource locator (English: Secure Routing Uniform Resource Locator, SR URL for short) and the key information. The service platform server connects to the SM-SR network element by using the SR URL, and downloads, from the SM-DP network element by using the key information of the profile and the SM-SR network element, the profile corresponding to the target traffic package, determined by the terminal device, of the operator. Optionally, in another embodiment, SM-DP+ can implement functions of the SM-SR and the SM-DP. Therefore, the foregoing functions implemented by the SM-DP and the SM-SR may be implemented by the SM-DP+.

Further, in an embodiment, the operator corresponding to the determined target traffic package may prepare the corresponding profile for the terminal device after determining that the fee paid by the corresponding terminal device is received.

108. The access platform server sends a traffic package subscription response message to the terminal device, where the traffic package subscription response message includes a token (English: token), and the token is used to indicate N profiles that can be downloaded by the terminal device.

Optionally, the traffic package subscription response message may further include an address of the access platform server and/or the confirmation code (English: confirmation code) identifier. The confirmation code identifier is used to indicate that a confirmation code needs to be entered when the terminal device sends a download request message. The confirmation code may be sent to the terminal device in another manner (for example, by using an SMS message).

Specifically, after obtaining the N profiles, the access platform server allocates the token to the N profiles of the terminal device. Optionally, in an embodiment, the access platform server may allocate one token to the N profiles of the terminal device, where the one token is used to indicate the N profiles. Optionally, in another embodiment, the access platform server may allocate N tokens to the N profiles of the terminal device, where the N tokens are corresponding to the N profiles in a one-to-one manner.

109. The terminal device sends a download request message to the access platform server, where the download request message includes the token.

Optionally, the download request message may further include the address of the access platform server and/or the confirmation code.

If the access platform server allocates one token to the N profiles, the token refers to the allocated one token. If the access platform server allocates N tokens to the N profiles, the token refers to the N tokens.

110. The service platform server sends a download request response message to the terminal device, where the download request response message includes the N profiles.

111. The terminal device installs the N profiles.

Optionally, in an embodiment, the terminal device may directly install the N profiles.

Optionally, in another embodiment, the terminal device may first install K profiles of the N profiles, where K is a positive integer less than N and greater than or equal to 1. K may be a quantity of profiles that can be installed in remaining space of an embedded universal integrated circuit card (English: embedded universal integrated circuit card, eUICC for short) of the terminal device. Specifically, a local profile assistant (English: Local Profile Assistant, LPA for short) entity of the terminal device may first determine the quantity of the profiles that can be installed in the remaining space of the eUICC of the terminal device. For example, the LPA entity of the terminal device may send a GetEUICCInfo command to the eUICC by using an ES10b interface. The eUICC sends, to the LPA entity, eUICC_info information as a response, where the eUICC_info information includes information about the remaining space. Different profiles may have different sizes. Therefore, the LPA entity of the terminal device may determine a value of K according to a size of the remaining space of the eUICC and a size of a to-be-downloaded profile. If the quantity of the profiles that can be installed in the remaining space of the eUICC of the terminal device is greater than N, the terminal device may install the N profiles. If the quantity K of the profiles that can be installed in the remaining space of the eUICC of the terminal device is less than N, the terminal device may first install the K profiles of the N profiles. Travelling schedule times in travelling schedule nodes corresponding to the K profiles that are first installed are earlier than a travelling schedule time in a travelling schedule node corresponding to a profile that has not been installed. Still using Table 1 as an example, assuming that K is equal to 1, the terminal device first installs a profile provided by an operator in France. This is because a user holding the terminal device first arrives in France. After that, the terminal device determines an invalid profile from the installed profile. The terminal device determines the invalid profile in any one of the following manners: If determining that a validity period of a profile expires, the terminal device determines that the profile whose validity period expires is the invalid profile. For example, the validity period of the profile is 3 days. Assuming that the terminal device determines that days in which the profile is used have exceeded 3 days, the terminal device determines that the profile is the invalid profile. If determining that total traffic of a profile is used up, the terminal device determines that the profile whose total traffic is used up is the invalid profile. For example, the total traffic included in the profile is 30 MB. Assuming that the terminal device determines that 30 MB has been used, the terminal device determines that the profile is the invalid profile. If determining that the terminal device has left a country in which an operator providing the profile is located, the terminal device determines that the profile is the invalid profile. The terminal device may determine, according to a PLMN obtained by means of searching, a country in which the terminal device is currently located. For example, when the terminal device determines that the PLMN obtained by means of searching is a PLMN of France, the terminal device determines that the terminal device has arrived in France. In this case, the terminal device may activate a corresponding profile and connect to a network of a specified operator. When the terminal device searches for a PLMN again and finds that a PLMN obtained by means of searching is a PLMN of Belgium, the terminal device may determine that the terminal device has left France. In this case, the terminal device determines that the profile provided by the operator in France is the invalid profile. After determining the invalid profile, the terminal device may delete the invalid profile. This is because the invalid profile will not be used by the terminal device again. After that, the terminal device may install a profile corresponding to a first target traffic package. The first target traffic package is a target traffic package corresponding to an earliest travelling schedule time among target traffic packages of profiles that have not been installed. For example, assuming that the terminal device sequentially visits France, Belgium, the Netherlands, and Denmark according to a time sequence, and K is equal to 2, the terminal device receives four profiles, where the four profiles are respectively provided by operators in France, Belgium, the Netherlands, and Denmark. The terminal device first installs profiles provided by operators in France and Belgium. After determining that a profile provided by an operator in France is an invalid profile (that is, determining that the profile provided by the operator in France will not be used again), the terminal device deletes the invalid profile, and installs a profile provided by an operator in the Netherlands. This is because the terminal device first arrives in the Netherlands and then arrives in Denmark. After that, the terminal device continues to determine that a profile provided by an operator in Belgium is an invalid profile, deletes the invalid profile, and installs a profile provided by an operator in Denmark. So far, the terminal device has installed the received four profiles.

112. The terminal device sends a traffic package subscription message to the access platform server, where the traffic package subscription message includes an identity of the determined target traffic package and identity information of the terminal device.

Step 112 is the same as step 106. Details are not described herein again.

113. The access platform server obtains, according to the identity of the determined target traffic package, a profile corresponding to the identity of the determined target traffic package.

Step 113 is the same as step 107. Details are not described herein again.

114. The access platform server sends a traffic package subscription response message to the terminal device, where the traffic package subscription response message includes a token, and the token is used to indicate the N profiles that can be downloaded by the terminal device.

Specifically, after obtaining the N profiles, the access platform server allocates the token to the N profiles of the terminal device. The access platform server may allocate one token (English: token) to the N profiles of the terminal device, where the one token is used to indicate the N profiles. Optionally, the traffic package subscription response message may further include an address of the access platform server and/or a confirmation code (English: confirmation code) identifier. The confirmation code identifier is used to indicate that a confirmation code needs to be entered when the terminal device sends a download request message. The confirmation code may be sent to the terminal device in another manner (for example, by using an SMS message).

115. The terminal device sends a download request message to the access platform server, where the download request message includes the token and identities of K travelling schedule nodes of the N travelling schedule nodes, and travelling schedule times corresponding to the K travelling schedule nodes are earlier than a travelling schedule time corresponding to another travelling schedule node of the N travelling schedule nodes.

Optionally, the download request message may further include the address of the access platform server and/or the confirmation code.

The identities of the travelling schedule nodes are information used to indicate locations of the travelling schedule nodes, for example, may be MCCs of the travelling schedule nodes.

Travelling schedule times corresponding to the K target traffic packages are earlier than a travelling schedule time corresponding to another target traffic package in the N target traffic packages. For example, assuming that the terminal device sequentially visits France, Belgium, the Netherlands, and Denmark according to a time sequence, and K is equal to 2, the terminal device first sends identities of target traffic packages in France and Belgium to the access platform server. Optionally, K may be a quantity of profiles that can be installed in remaining space of an eUICC of the terminal device. That is, the terminal device may determine a value of K according to the remaining space of the eUICC of the terminal device and a size of the N profiles. If the quantity of the profiles that can be installed in the remaining space of the eUICC of the terminal device is greater than N, the terminal device may install the N profiles. If the quantity K of the profiles that can be installed in the remaining space of the eUICC of the terminal device is less than N, the terminal device may first install the K profiles of the N profiles. It can be understood that the K profiles are corresponding to the K travelling schedule nodes in a one-to-one manner.

116. The access platform server sends a download request response message to the terminal device, where the download request response message includes the K profiles.

117. The terminal device installs the K profiles.

118. The terminal device determines an invalid profile from the installed profiles.

Specifically, the terminal device determines the invalid profile in any one of the following manners: If determining that a validity period of a profile expires, the terminal device determines that the profile whose validity period expires is the invalid profile. For example, the validity period of the profile is 3 days. Assuming that the terminal device determines that days in which the profile is used have exceeded 3 days, the terminal device determines that the profile is the invalid profile. If determining that total traffic of a profile is used up, the terminal device determines that the profile whose total traffic is used up is the invalid profile. For example, the total traffic included in the profile is 30 MB. Assuming that the terminal device has used 30 MB, the terminal device determines that the profile is the invalid profile. If determining that the terminal device has left a country in which an operator providing the profile is located, the terminal device determines that the profile is the invalid profile. The terminal device may determine, according to a public land mobile network (English: Public Land Mobile Network, PLMN for short) obtained by means of searching, a country in which the terminal device is currently located. For example, when the terminal device determines that the PLMN obtained by means of searching is a PLMN of France, the terminal device determines that the terminal device has arrived in France. In this case, the terminal device may activate a corresponding profile and connect to a network of a specified operator. When the terminal device searches for a PLMN again and finds that a PLMN obtained by means of searching is a PLMN of Belgium, the terminal device may determine that the terminal device has left France. In this case, the terminal device determines that the profile provided by the operator in France is the invalid profile.

119. The terminal device deletes the invalid profile.

120. The terminal device sends an update message to the access platform server, where the update message includes the token and an identity of a first travelling schedule node, and the first travelling schedule node is a travelling schedule node corresponding to an earliest travelling schedule time among travelling schedule nodes for which no profile has been installed.

121. The terminal device receives an update response message sent by the access platform server, where the update response message includes a profile corresponding to the first travelling schedule node.

122. The terminal device installs the profile corresponding to the first travelling schedule node.

After performing step 122, the terminal device may determine whether the N profiles are cumulatively installed. If not, the terminal device continues to perform step 118 to step 122 until the N profiles are cumulatively installed.

For example, assuming that the terminal device sequentially visits France, Belgium, the Netherlands, and Denmark according to a time sequence, and K is equal to 2, the terminal device should install four profiles in total, where the four profiles are respectively provided by operators in France, Belgium, the Netherlands, and Denmark. Because the remaining space of the eUICC is insufficient, the terminal device first installs profiles provided by operators in France and Belgium. After determining that a profile provided by an operator in France is an invalid profile (that is, determining that the profile provided by the operator in France will not be used again), the terminal device deletes the invalid profile. Then, the terminal device sends an update message to the access platform server, where the update message includes an identity of the Netherlands and the token. This is because the terminal device first arrives in the Netherlands and then arrives in Denmark. After that, the terminal device receives an update response message that includes a profile provided by an operator in the Netherlands and that is sent by the access platform server, and installs the profile provided by the operator in the Netherlands. After that, the terminal device continues to determine that a profile provided by an operator in Belgium is an invalid profile, and deletes the invalid profile. Then, the terminal device sends an update message to the access platform server, where the update message includes an identity of Denmark and the token. After that, the terminal device receives an update response message that includes a profile provided by an operator in Denmark and that is sent by the access platform server, and installs the profile provided by the operator in Denmark. So far, the terminal device determines that the four profiles have been installed, and does not send an update message to the access platform server again to require the access platform server to send a new profile. It can be understood that description of the remaining space in this embodiment of the present invention is merely an example, and a specific size of storage space of the eUICC is not specifically limited in this solution.

Optionally, in another embodiment, in addition to a manner of downloading and installing the profile corresponding to each target traffic package according to step 106 to step 111 or according to step 112 to step 122, the profile corresponding to each target traffic package may be downloaded and installed in the following manner:

The terminal device sends a traffic package subscription message to the access platform server, where the traffic package subscription message includes an identity of the determined target traffic package, identity information of the terminal device, and identities of K travelling schedule nodes of the N travelling schedule nodes. The access platform server obtains K profiles corresponding to the identities of the K travelling schedule nodes. A specific procedure in which an operator prepares a profile and the access platform obtains the profile is the same as that in the foregoing embodiment. Details do not need to be described herein again. The access platform server allocates a token to the terminal device, where the token is used to indicate a profile that can be downloaded by the terminal device. Optionally, in an embodiment, the access platform server may allocate one token to the terminal device. Optionally, in another embodiment, the access platform server may allocate one token to each to-be-downloaded profile of the terminal device. The terminal device sends a download request message to the access platform server, where the download request message includes the token. After that, the service platform server sends a download request response message to the terminal device, where the download request response message includes the K profiles. The terminal device installs the K profiles. It can be understood that the K profiles are corresponding to the K travelling schedule nodes in a one-to-one manner. After installing the K profiles, the terminal device may determine whether a profile needs to be updated until the N profiles are installed. A specific procedure is similar to step 118 to step 122. A difference lies only in that after obtaining an update message, the access platform server obtains, from a corresponding operator according to an identity of a first travelling schedule node in the update message, a profile corresponding to the first travelling schedule node. That is, in this technical solution, the access platform server first obtains the K profiles preferentially downloaded by the terminal device, and when the terminal device needs to update a profile, obtains, from a corresponding operator by using an application server, the profile that needs to be updated. Further, a value of K may be 1. In this way, the operator does not need to allocate a resource to the terminal device well in advance. This avoids a problem that a resource is insufficient for allocation. Certainly, the terminal device may determine a value of K according to remaining space of an eUICC of the terminal device.

In this embodiment of the present invention, installing a profile means downloading the profile and installing the profile onto the eUICC. The eUICC may obtain the profile from the access platform server by using the LPA entity. When the remaining space of the eUICC is insufficient, the profile may be first downloaded from the access platform server onto the LPA entity for caching. The LPA entity may obtain information about remaining resource space from the eUICC by using the GetEUICCInfo command. Alternatively, the LPA entity may obtain, from the eUICC by using a GetProfilesInfo command, a quantity of profiles that have been installed. The LPA entity may read, from a cache, a profile that needs to be installed on the eUICC, and downloads, onto the eUICC, the profile that needs to be installed on the eUICC. After downloading, from the LPA entity, the profile that needs to be installed, the eUICC installs the corresponding profile.

Figure 2:
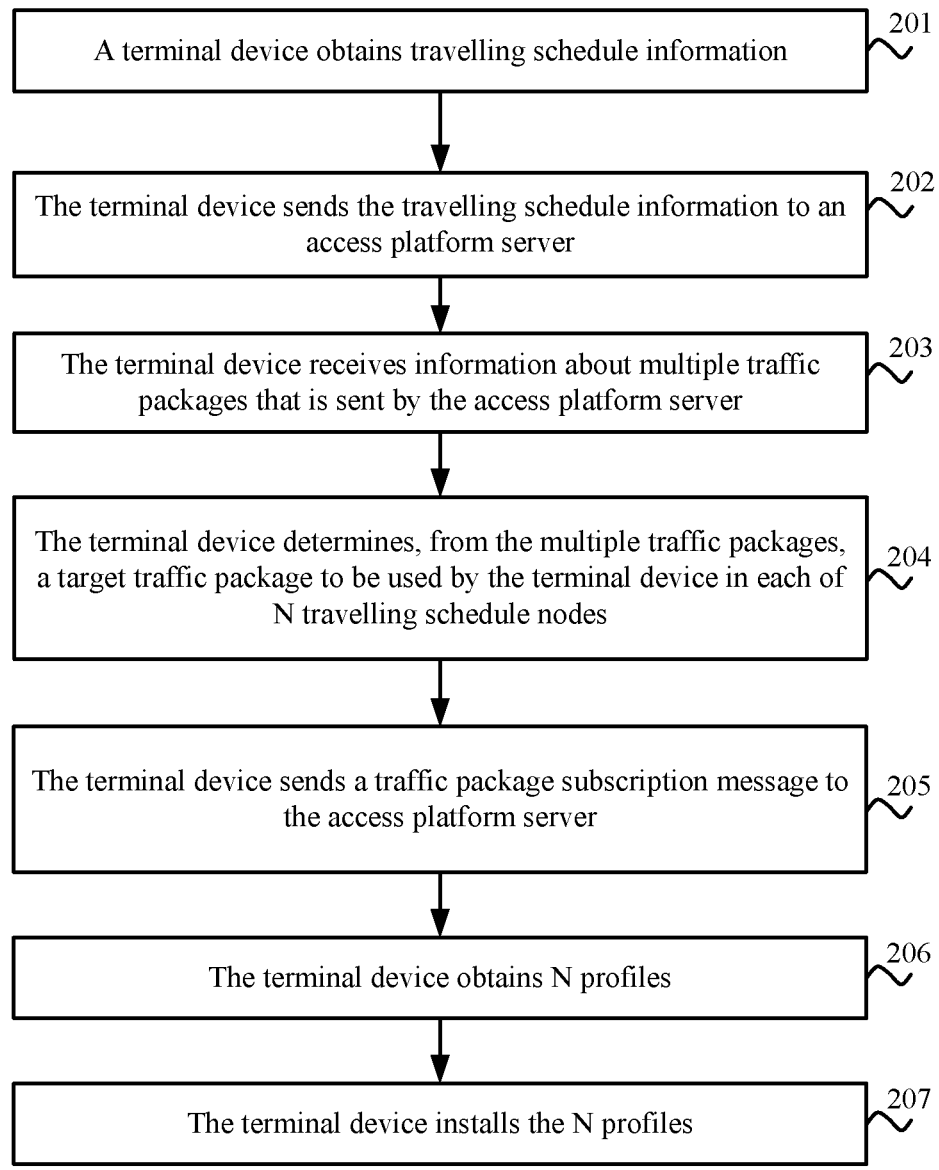
FIG. 2 is a schematic flowchart of a traffic package providing method according to an embodiment of the present invention.

FIG. 2 is a schematic flowchart of a traffic package providing method according to an embodiment of the present invention.

201. A terminal device obtains travelling schedule information, where the travelling schedule information includes N travelling schedule nodes, N is a positive integer greater than or equal to 1, and the terminal device is a terminal device that supports an eUICC.

202. The terminal device sends the travelling schedule information to an access platform server.

203. The terminal device receives information about multiple traffic packages that is sent by the access platform server, where each of the N travelling schedule nodes is corresponding to information about at least one traffic package in the information about the multiple traffic packages, and the information about the multiple traffic packages is provided by an operator.

204. The terminal device determines, from the multiple traffic packages, a target traffic package to be used by the terminal device in each of the N travelling schedule nodes.

205. The terminal device sends a traffic package subscription message to the access platform server, where the traffic package subscription message includes an identity of the determined target traffic package and identity information of the terminal.

206. The terminal device obtains N profiles, where the N profiles are corresponding to the N travelling schedule nodes in a one-to-one manner.

207. The terminal device installs the N profiles.

In the method shown in FIG. 2, the access platform server may be implemented by a terminal vendor. The terminal vendor deploys the access platform server that reaches an agreement with operators. By using the access platform server provided by the terminal vendor and an application service on the terminal device, a better traffic service is provided for the terminal device, and user experience is improved, without harming interests of the operators. Alternatively, the access platform server may be implemented by an operator. The operator reaches an agreement with another operator. The access platform server of the operator presents traffic of multiple contracted operators to the terminal device, and interacts with an application service on the terminal device to improve user experience and user stickiness. In addition, the access platform server may be implemented by another third party. The third party signs agreements with operators, and provides a better traffic service for the terminal device by using a platform server run by the third party and an application service on the terminal device, to improve user experience. In addition, the terminal device can select an appropriate traffic package from at least one traffic package. Therefore, a user has more choices, thereby improving user experience. Moreover, because the terminal device supports the eUICC, after installing a profile, the terminal device can use a corresponding traffic package to use a network service, without a need of changing a SIM card. A possible result caused by changing the SIM card is avoided. For example, a replaced SIM card is lost, or an incorrect SIM card is substituted.

The information about the traffic packages may include identities of the traffic packages, validity times of the traffic packages, total traffic of the traffic packages, and prices of the traffic packages. The identities of the traffic packages include index values of the traffic packages and identity information of the operator that provides services for the traffic packages. The information about the traffic packages may further include the identity information of the operator that provides services for the traffic packages. The identity information may further include geographic location information. For example, the identity information may be a public land mobile network (English: Public Land Mobile Network, PLMN for short), or location information coordinates obtained by using a positioning technology, such as the Global Positioning System (English: Global Positioning System, GPS for short). In this way, the terminal device may determine, according to the PLMN, a geographic location in which the traffic packages can be used.

Optionally, in an embodiment, before the determining, from the multiple traffic packages, a target traffic package to be used by the terminal device in each of the N travelling schedule nodes, the method may further include: obtaining traffic requirement information, where the traffic requirement information is used to indicate total traffic that needs to be used; and obtaining a network capability parameter of the operator that provides the multiple traffic packages; and the determining, from the multiple traffic packages, a target traffic package to be used by the terminal device in each of the N travelling schedule nodes includes: determining, from the multiple traffic packages, a traffic package matching a network capability parameter of the terminal device as a candidate traffic package; and determining, from the candidate traffic package, a candidate traffic package matching the traffic requirement information as the target traffic package. In this way, the terminal device can automatically determine, according to the traffic requirement information, a traffic package conforming to a usage habit of a user.

Optionally, in another embodiment, the travelling schedule information further includes N travelling schedule times that are corresponding to the N travelling schedule nodes in a one-to-one manner, and before the determining, from the multiple traffic packages, a target traffic package to be used by the terminal device in each of the N travelling schedule nodes, the method further includes: obtaining traffic requirement information, where the traffic requirement information is used to indicate total traffic that needs to be used; and obtaining a network capability parameter of the operator that provides the multiple traffic packages; and the determining, from the multiple traffic packages, a target traffic package to be used by the terminal device in each of the N travelling schedule nodes includes: determining, from the multiple traffic packages, a traffic package matching a network capability parameter of the terminal device as a candidate traffic package; and determining, from the candidate traffic package, a candidate traffic package matching the traffic requirement information and the nth travelling schedule time as a target traffic package in the nth travelling schedule node, where n=1, . . . , N.

Optionally, in an embodiment, the obtaining N profiles includes: receiving a traffic package subscription response message sent by the access platform server, where the traffic package subscription response message includes a token, and the token is used to indicate the N profiles; sending a download request message to the access platform server, where the download request message includes the token; and receiving a download request response message sent by the access platform server, where the download request response message includes the N profiles.

Further, the travelling schedule information further includes the N travelling schedule times that are corresponding to the N travelling schedule nodes in a one-to-one manner, and the installing the N profiles includes: sequentially installing the N profiles according to a quantity of profiles that can be installed on the eUICC of the terminal device and according to a sequence of a travelling schedule time corresponding to each of the N profiles.

Optionally, in another embodiment, the travelling schedule information further includes N travelling schedule times that are corresponding to the N travelling schedule nodes in a one-to-one manner, and the obtaining N profiles includes: receiving a traffic package subscription response message sent by the access platform server, where the traffic package subscription response message includes a token, and the token is used to indicate the N profiles; sending a download request message to the access platform server, where the download request message includes the token and an identity or identities of one or more travelling schedule nodes of the N travelling schedule nodes, and the one or more travelling schedule nodes are one or more travelling schedule nodes whose travelling schedule time is earliest among travelling schedule nodes for which no corresponding profile has been obtained; receiving a download request response message sent by the access platform server, where the download request response message includes a profile or profiles corresponding to the one or more travelling schedule nodes; and continuing to send a download request message to the access platform server and receive a download request response message sent by the access platform server, until the N profiles are obtained. It can be understood that after obtaining a profile, the terminal device may install the obtained profile. In addition, the terminal device may further determine an invalid profile from the installed profile, and delete the invalid profile, to prevent the invalid profile from occupying storage space of the eUICC. In this way, the terminal device may obtain and install a corresponding profile before the profile needs to be used, without a need of obtaining and installing all to-be-used profiles at one time.

Specifically, after receiving the traffic package subscription response message, the terminal device may determine an installation sequence of the N profiles according to a sequence of the N travelling schedule times, where the installation sequence of the N profiles is the same as a sequence of corresponding travelling schedule times. The terminal device determines, according to the determined installation sequence, an identity of a travelling schedule node in the download request message. Specifically, the download request message may include identities of K travelling schedule nodes of the N travelling schedule nodes, where travelling schedule times corresponding to the K travelling schedule nodes are earlier than a travelling schedule time corresponding to another travelling schedule node of the N travelling schedule nodes. The terminal device receives a download request response message sent by the access platform server, where the download request response message includes K profiles. Then, the terminal device may determine an identity of a travelling schedule node in the download request message again. The travelling schedule node that is in the download request message and that is determined by the terminal device again is one or more travelling schedule nodes corresponding to an earliest travelling schedule time among travelling schedule nodes for which no profile has been installed. The terminal device receives a download request response message sent by the access platform server, where the download request response message includes a profile corresponding to the travelling schedule node that is in the download request message and that is determined again. It can be understood that after obtaining a profile, the terminal device may install the obtained profile. In addition, the terminal device may further determine an invalid profile from the installed profile, and delete the invalid profile, to prevent the invalid profile from occupying storage space of the eUICC.

Optionally, in another embodiment, the traffic package subscription message may further include identities of K travelling schedule nodes of the N travelling schedule nodes, where travelling schedule times corresponding to the K travelling schedule nodes are earlier than a travelling schedule time corresponding to another travelling schedule node of the N travelling schedule nodes. The terminal device receives a traffic package subscription response message sent by the access platform server, where the traffic package subscription response message includes a token, and the token is used to indicate a profile that can be downloaded by the terminal device. The terminal device sends a download request message to the access platform server, where the download request message includes the token. The terminal device receives a download request response message sent by the access platform server, where the download request response message includes K profiles. The terminal device installs the K profiles. It can be understood that the K profiles are corresponding to the K travelling schedule nodes in a one-to-one manner. Optionally, a value of K may be 1. Alternatively, the terminal device may determine a value of K according to remaining space, in which a profile can be installed, of the terminal device and according to a size of space occupied by the N profiles. In this way, an error caused by insufficient remaining space for installing a profile can be avoided. Further, the method may further include: determining, by the terminal device, an invalid profile from the installed profiles; deleting, by the terminal device, the invalid profile; sending, by the terminal device, an update message to the access platform server, where the update message includes an identity of a first travelling schedule node and the token, and the first travelling schedule node is a travelling schedule node corresponding to an earliest travelling schedule time among travelling schedule nodes for which no profile has been installed; receiving, by the terminal device, an update response message sent by the access platform server, where the update response message includes a profile corresponding to the first travelling schedule node; and installing, by the terminal device, the profile corresponding to the first travelling schedule node. Further, the terminal device may repeat the foregoing process, until the N profiles are obtained and installed. In this way, it can be ensured that a corresponding profile has been installed when the terminal device arrives in a new travelling schedule node.

Figure 3:
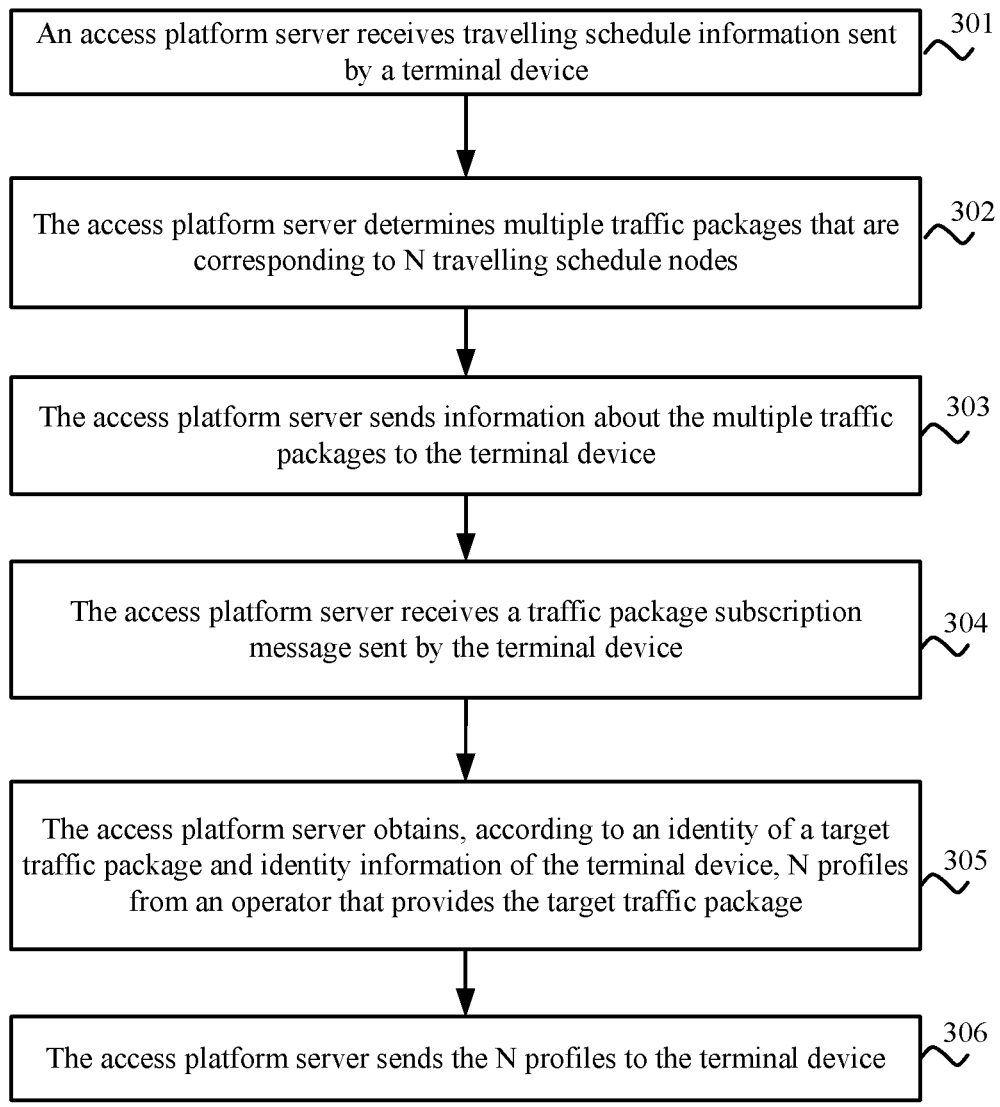
FIG. 3 is a schematic flowchart of a traffic package providing method according to an embodiment of the present invention.

FIG. 3 is a schematic flowchart of a traffic package providing method according to an embodiment of the present invention.

301. An access platform server receives travelling schedule information sent by a terminal device, where the travelling schedule information includes N travelling schedule nodes, and N is a positive integer greater than or equal to 1.

302. The access platform server determines multiple traffic packages that are corresponding to the N travelling schedule nodes, where the multiple traffic packages are provided by an operator, and each of the multiple traffic packages is corresponding to at least one of the N travelling schedule nodes.

303. The access platform server sends information about the multiple traffic packages to the terminal device.

304. The access platform server receives a traffic package subscription message sent by the terminal device, where the traffic package subscription message includes an identity of a target traffic package and identity information of the terminal device.

305. The access platform server obtains, according to the identity of the target traffic package and the identity information of the terminal device, N profiles from the operator that provides the target traffic package, where the N profiles are corresponding to the N travelling schedule nodes in a one-to-one manner.

306. The access platform server sends the N profiles to the terminal device.

In the method shown in FIG. 3, the access platform server may be implemented by a terminal vendor. The terminal vendor deploys the access platform server that reaches an agreement with operators. By using the access platform server provided by the terminal vendor and an application service on the terminal device, a better traffic service is provided for the terminal device, and user experience is improved, without harming interests of the operators. Alternatively, the access platform server may be implemented by an operator. The operator reaches an agreement with another operator. The access platform server of the operator presents traffic of multiple contracted operators to the terminal device, and interacts with an application service on the terminal device to improve user experience and user stickiness. In addition, the access platform server may be implemented by another third party. The third party signs agreements with operators, and provides a better traffic service for the terminal device by using a platform server run by the third party and an application service on the terminal device, to improve user experience. Moreover, the terminal device can select an appropriate traffic package from at least one traffic package. Therefore, a user has more choices, thereby improving user experience.

The information about the traffic packages may include identities of the traffic packages, validity times of the traffic packages, total traffic of the traffic packages, and prices of the traffic packages. The identities of the traffic packages include index values of the traffic packages and identity information of the operator that provides services for the traffic packages. The information about the traffic packages may further include the identity information of the operator that provides services for the traffic packages. The identity information may further include geographic location information. For example, the identity information may be a public land mobile network (English: Public Land Mobile Network, PLMN for short), or location information coordinates obtained by using a positioning technology, such as the Global Positioning System (English: Global Positioning System, GPS for short). In this way, the terminal device may determine, according to the PLMN, a geographic location in which the traffic packages can be used.

Optionally, in an embodiment, before the sending the N profiles to the terminal device, the method further includes: sending a traffic package subscription response message to the terminal device, where the traffic package subscription response message includes a token, and the token is used to indicate the N profiles; and receiving a download request message sent by the terminal device, where the download request message includes the token and identities of the N travelling schedule nodes; and the sending the N profiles to the terminal device includes: sending a download request response message to the terminal device, where the download request response message includes the N profiles.

Optionally, in another embodiment, before the sending the N profiles to the terminal device, the method may further include: sending a traffic package subscription response message to the terminal device, where the traffic package subscription response message includes a token, and the token is used to indicate the N profiles; and receiving a download request message sent by the terminal device, where the download request message includes the token and an identity or identities of one or more travelling schedule nodes of the N travelling schedule nodes; and the sending the N profiles to the terminal device includes: sending a download request response message to the access platform server, where the download request response message includes a profile or profiles corresponding to the one or more travelling schedule nodes; and continuing to receive a download request message sent by the terminal device and send a download request response message to the terminal device, until the N profiles are sent to the terminal device.

Optionally, in another embodiment, the traffic package subscription message may include identities of K travelling schedule nodes of the N travelling schedule nodes, where travelling schedule times corresponding to the K travelling schedule nodes are earlier than a travelling schedule time corresponding to another travelling schedule node of the N travelling schedule nodes. The access platform server may obtain, according to the identity of the target traffic package and the identities of the K travelling schedule nodes, K profiles from an operator that provides target traffic packages corresponding to the K travelling schedule nodes, where the K profiles are corresponding to the K travelling schedule nodes in a one-to-one manner. The access platform server sends a traffic package subscription response message to the terminal device, where the traffic package subscription response message includes a token, and the token is used to indicate a profile that can be downloaded by the terminal device. The access platform server receives a download request message sent by the terminal device, where the download request message includes the token. The access platform server sends a download request response message to the terminal device, where the download request response message includes the K profiles. Further, the method may further include: receiving, by the access platform server, an update message sent by the terminal device, where the update message includes an identity of a first travelling schedule node and the token, and the first travelling schedule node is a travelling schedule node corresponding to an earliest travelling schedule time among travelling schedule nodes for which no profile has been installed; and sending, by the access platform server, an update response message to the terminal device, where the update response message includes a profile corresponding to the first travelling schedule node.

An embodiment of the present invention further provides a terminal device. The terminal device includes an obtaining unit, a sending unit, a receiving unit, and a determining unit. The terminal device may perform the steps performed by the terminal device in FIG. 1 and FIG. 3.

The obtaining unit is configured to obtain travelling schedule information, where the travelling schedule information includes N travelling schedule nodes, and N is a positive integer greater than or equal to 1.

The sending unit is configured to send the travelling schedule information to an access platform server.

The receiving unit is configured to receive information about multiple traffic packages that is sent by the access platform server, where each of the N travelling schedule nodes is corresponding to information about at least one traffic package in the information about the multiple traffic packages, and the information about the multiple traffic packages is provided by an operator.

The determining unit is configured to determine, from the multiple traffic packages, a target traffic package to be used by the terminal device in each of the N travelling schedule nodes.

The sending unit is further configured to send a traffic package subscription message to the access platform server, where the traffic package subscription message includes an identity of the determined target traffic package and identity information of the terminal.

The receiving unit is configured to obtain N profiles, where the N profiles are corresponding to the N travelling schedule nodes in a one-to-one manner.

The determining unit is further configured to install the N profiles.

The information about the traffic packages may include identity information of the operator that provides services for the traffic packages. The identity information may also include geographic location information. For example, the identity information may be a public land mobile network (English: Public Land Mobile Network, PLMN for short), or location information coordinates obtained by using a positioning technology, such as the Global Positioning System (English: Global Positioning System, GPS for short).

Optionally, the information about the traffic packages includes identities, validity times, total traffic, and prices of the traffic packages. The identities of the traffic packages include index values of the traffic packages and the identity information of the operator that provides services for the traffic packages.

Optionally, in an embodiment, the obtaining unit is further configured to obtain traffic requirement information and a network capability parameter of the operator that provides the multiple traffic packages, where the traffic requirement information is used to indicate total traffic that needs to be used. The determining unit is specifically configured to determine, from the multiple traffic packages, a traffic package matching a network capability parameter of the terminal device as a candidate traffic package, and determine, from the candidate traffic package, a candidate traffic package matching the traffic requirement information as the target traffic package.

Optionally, in another embodiment, the travelling schedule information further includes N travelling schedule times that are corresponding to the N travelling schedule nodes in a one-to-one manner. The obtaining unit is further configured to obtain traffic requirement information and a network capability parameter of the operator that provides the multiple traffic packages, where the traffic requirement information is used to indicate total traffic that needs to be used. The determining unit is specifically configured to determine, from the multiple traffic packages, a traffic package matching a network capability parameter of the terminal device as a candidate traffic package, and determine, from the candidate traffic package, a candidate traffic package matching the traffic requirement information and the nth travelling schedule time as a target traffic package in the nth travelling schedule node, where n=1, . . . , N.

Optionally, in an embodiment, the receiving unit is further configured to receive a traffic package subscription response message sent by the access platform server, where the traffic package subscription response message includes a token, and the token is used to indicate the N profiles. The sending unit is further configured to send a download request message to the access platform server, where the download request message includes the token. The receiving unit is specifically configured to receive a download request response message sent by the access platform server, where the download request response message includes the N profiles.

Optionally, in an embodiment, the travelling schedule information further includes N travelling schedule times that are corresponding to the N travelling schedule nodes in a one-to-one manner. The determining unit is specifically configured to sequentially install the N profiles according to a quantity of profiles that can be installed on an eUICC of the terminal device and according to a sequence of a travelling schedule time corresponding to each of the N profiles, and delete an invalid profile.

Optionally, in another embodiment, the travelling schedule information further includes N travelling schedule times that are corresponding to the N travelling schedule nodes in a one-to-one manner. The receiving unit is further configured to receive a traffic package subscription response message sent by the access platform server, where the traffic package subscription response message includes a token, and the token is used to indicate the N profiles. The sending unit is further configured to send a download request message to the access platform server, where the download request message includes the token and an identity or identities of one or more travelling schedule nodes of the N travelling schedule nodes, and the one or more travelling schedule nodes are one or more travelling schedule nodes whose travelling schedule time is earliest among travelling schedule nodes for which no corresponding profile has been obtained. The receiving unit is further configured to receive a download request response message sent by the access platform server, where the download request response includes a profile or profiles corresponding to the one or more travelling schedule nodes. The sending unit is further configured to continue to send a download request message to the access platform server, and the receiving unit is further configured to continue to receive a download request response message sent by the access platform server, until the N profiles are obtained.

An embodiment of the present invention further provides a server. The server includes a receiving unit, a determining unit, and a sending unit. The server may perform the steps performed by the access platform server in FIG. 2 and FIG. 3.

The receiving unit is configured to receive travelling schedule information sent by a terminal device, where the travelling schedule information includes N travelling schedule nodes, and N is a positive integer greater than or equal to 1.

The determining unit is configured to determine multiple traffic packages that are corresponding to the N travelling schedule nodes, where the multiple traffic packages are provided by an operator, and each of the multiple traffic packages is corresponding to at least one of the N travelling schedule nodes.

The sending unit is configured to send information about the multiple traffic packages to the terminal device.

The receiving unit is further configured to receive a traffic package subscription message sent by the terminal device, where the traffic package subscription message includes an identity of a target traffic package and identity information of the terminal device.

The receiving unit is further configured to obtain, according to the identity of the target traffic package and the identity information of the terminal device, N profiles from the operator that provides the target traffic package, where the N profiles are corresponding to the N travelling schedule nodes in a one-to-one manner.

The sending unit is further configured to send the N profiles to the terminal device.

The information about the traffic packages may include identity information of the operator that provides services for the traffic packages. The identity information may also include geographic location information. For example, the identity information may be a public land mobile network (English: Public Land Mobile Network, PLMN for short), or location information coordinates obtained by using a positioning technology, such as the Global Positioning System (English: Global Positioning System, GPS for short).

Optionally, the information about the traffic packages includes identities of the traffic packages, validity times of the traffic packages, total traffic of the traffic packages, and prices of the traffic packages. The identities of the traffic packages include index values of the traffic packages and identity information of the operator that provides services for the traffic packages.

Optionally, in an embodiment, the sending unit is further configured to send a traffic package subscription response message to the terminal device, where the traffic package subscription response message includes a token, and the token is used to indicate the N profiles. The receiving unit is further configured to receive a download request message sent by the terminal device, where the download request message includes the token and identities of the N travelling schedule nodes. The sending unit is specifically configured to send a download request response message to the terminal device, where the download request response message includes the N profiles.

Optionally, in another embodiment, the sending unit is further configured to send a traffic package subscription response message to the terminal device, where the traffic package subscription response message includes a token, and the token is used to indicate the N profiles. The receiving unit is further configured to receive a download request message sent by the terminal device, where the download request message includes the token and an identity or identities of one or more travelling schedule nodes of the N travelling schedule nodes. The sending unit is specifically configured to send a download request response message to the access platform server, where the download request response message includes a profile or profiles corresponding to the one or more travelling schedule nodes. The receiving unit is specifically configured to continue to receive a download request message sent by the terminal device. The sending unit is specifically configured to send a download request response message to the terminal device, until the N profiles are sent to the terminal device.

Figure 4:
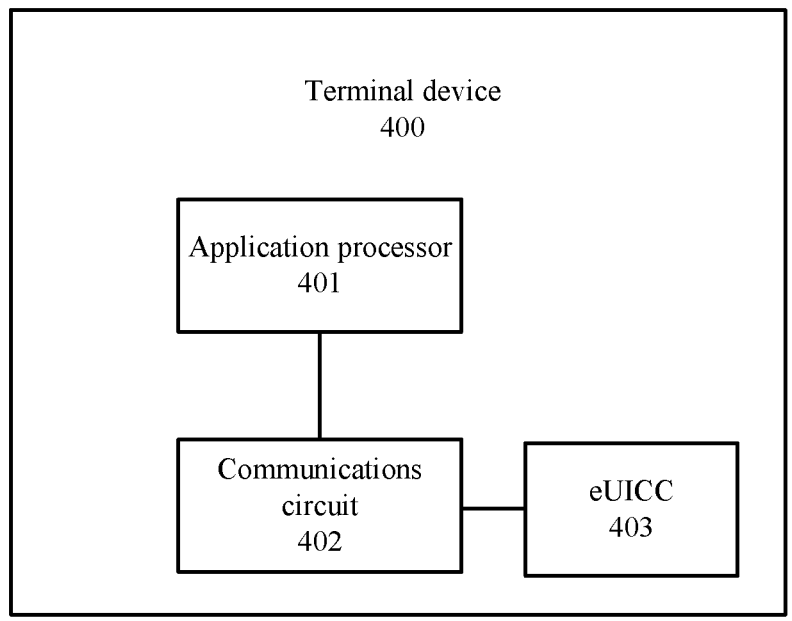
FIG. 4 is a structural block diagram of a terminal device according to an embodiment of the present invention.

FIG. 4 is a structural block diagram of a terminal device according to an embodiment of the present invention. The terminal device 400 shown in FIG. 4 includes an application processor 401, a communications circuit 402, and an eUICC 403. The terminal device 400 may perform the steps performed by the terminal device shown in FIG. 1 and FIG. 3.

The method disclosed in the foregoing embodiments of the present invention may be applied to the application processor 401, or implemented by the application processor 401. The application processor 401 may be an integrated circuit chip that has a signal processing capability. In an implementation process, the steps of the foregoing methods may be performed by using an integrated logical circuit of hardware in the application processor 401 or an instruction in a form of software. The application processor 401 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or a transistor logical device, or a discrete hardware component. The methods, the steps, and the logical block diagrams disclosed in the embodiments of the present invention can be implemented or executed. The general-purpose processor may be a microprocessor, or the application processor may be any conventional processor or the like. The steps of the methods disclosed in the embodiments of the present invention may be directly performed by a hardware decoding processor, or may be performed by a combination of hardware and a software module in a decoding processor.

The application processor 401 is configured to obtain travelling schedule information, where the travelling schedule information includes N travelling schedule nodes, and N is a positive integer greater than or equal to 1.

The communications circuit 402 is configured to send the travelling schedule information to an access platform server.

The communications circuit 402 is further configured to receive information about multiple traffic packages that is sent by the access platform server, where each of the N travelling schedule nodes is corresponding to information about at least one traffic package in the information about the multiple traffic packages, and the information about the multiple traffic packages is provided by an operator.

The application processor 401 is further configured to determine, from the multiple traffic packages, a target traffic package to be used by the terminal device in each of the N travelling schedule nodes.

The communications circuit 402 is further configured to send a traffic package subscription message to the access platform server, where the traffic package subscription message includes an identity of the determined target traffic package and identity information of the terminal.

The communications circuit 402 is further configured to obtain N profiles, where the N profiles are corresponding to the N travelling schedule nodes in a one-to-one manner.

The eUICC 403 is configured to install the N profiles.

A traffic package used by the terminal device 400 shown in FIG. 4 may be directly provided by an operator in a travelling schedule node that the terminal device needs to visit. In other words, the operator may directly provide a temporary traffic package for the terminal device, without a need of providing traffic to a third-party platform in a wholesale manner. In addition, the terminal device can select an appropriate traffic package from at least one traffic package. Therefore, a user has more choices, thereby improving user experience. Moreover, because the terminal device supports the eUICC, after installing a profile, the terminal device can use a corresponding traffic package to use a network service, without a need of changing a SIM card. A possible result caused by changing the SIM card is avoided. For example, a replaced SIM card is lost, or an incorrect SIM card is substituted.

The information about the traffic packages may include identities of the traffic packages, validity times of the traffic packages, total traffic of the traffic packages, and prices of the traffic packages. The identities of the traffic packages include index values of the traffic packages and identity information of the operator that provides services for the traffic packages. The information about the traffic packages may further include the identity information of the operator that provides services for the traffic packages. The identity information may further include geographic location information. For example, the identity information may be a public land mobile network (English: Public Land Mobile Network, PLMN for short), or location information coordinates obtained by using a positioning technology, such as the Global Positioning System (English: Global Positioning System, GPS for short). In this way, the terminal device may determine, according to the PLMN, a geographic location in which the traffic packages can be used.

Optionally, in an embodiment, the application processor 401 is further configured to obtain traffic requirement information and a network capability parameter of the operator that provides the multiple traffic packages, where the traffic requirement information is used to indicate total traffic that needs to be used. The application processor 401 is specifically configured to determine, from the multiple traffic packages, a traffic package matching a network capability parameter of the terminal device as a candidate traffic package, and determine, from the candidate traffic package, a candidate traffic package matching the traffic requirement information as the target traffic package.

Optionally, in another embodiment, the travelling schedule information further includes N travelling schedule times that are corresponding to the N travelling schedule nodes in a one-to-one manner. The application processor 401 is further configured to obtain traffic requirement information and a network capability parameter of the operator that provides the multiple traffic packages, where the traffic requirement information is used to indicate total traffic that needs to be used. The application processor 401 is specifically configured to determine, from the multiple traffic packages, a traffic package matching a network capability parameter of the terminal device as a candidate traffic package, and determine, from the candidate traffic package, a candidate traffic package matching the traffic requirement information and the nth travelling schedule time as a target traffic package in the nth travelling schedule node, where n=1, . . . , N.

Optionally, in an embodiment, the communications circuit 402 is specifically configured to: receive a traffic package subscription response message sent by the access platform server, where the traffic package subscription response message includes a token, and the token is used to indicate the N profiles; send a download request message to the access platform server, where the download request message includes the token; and receive a download request response message sent by the access platform server, where the download request response message includes the N profiles.

Further, the travelling schedule information further includes N travelling schedule times that are corresponding to the N travelling schedule nodes in a one-to-one manner. The eUICC 403 is specifically configured to sequentially install the N profiles according to a quantity of profiles that can be installed on the eUICC of the terminal device and according to a sequence of a travelling schedule time corresponding to each of the N profiles, and delete an invalid profile.

Optionally, in another embodiment, the travelling schedule information further includes N travelling schedule times that are corresponding to the N travelling schedule nodes in a one-to-one manner. The communications circuit 402 is specifically configured to: receive a traffic package subscription response message sent by the access platform server, where the traffic package subscription response message includes a token, and the token is used to indicate the N profiles; send a download request message to the access platform server, where the download request message includes the token and an identity or identities of one or more travelling schedule nodes of the N travelling schedule nodes, and the one or more travelling schedule nodes are one or more travelling schedule nodes whose travelling schedule time is earliest among travelling schedule nodes for which no corresponding profile has been obtained; receive a download request response message sent by the access platform server, where the download request response includes a profile or profiles corresponding to the one or more travelling schedule nodes; and continue to send a download request message to the access platform server and receive a download request response message sent by the access platform server, until the N profiles are obtained.

In this embodiment of the present invention, installing a profile by the eUICC means downloading the profile and installing the profile onto the eUICC. The eUICC may obtain the profile from the access platform server by using an LPA entity, and install the corresponding profile. The LPA entity runs in the application processor 401 in a form of software. The application processor 401 may interact with the communications circuit 402 by using an attention (English: Attention, AT for short) command. The communications circuit 402 may interact with the eUICC 403 by using the following command: a command (from a card reader to a card) defined for a smartcard by the International Organization for Standardization (English: International Organization for Standardization, ISO for short), a command defined for a telecommunications smartcard by the European Telecommunications Standards Institute (English: European Telecommunications Standards Institute, ETSI for short), or a command defined for a multi-application framework by the Global Platform Card Specification (English: Global Platform Card Specification). The ETSI also defines an active command from a UICC to a terminal.

Figure 5:
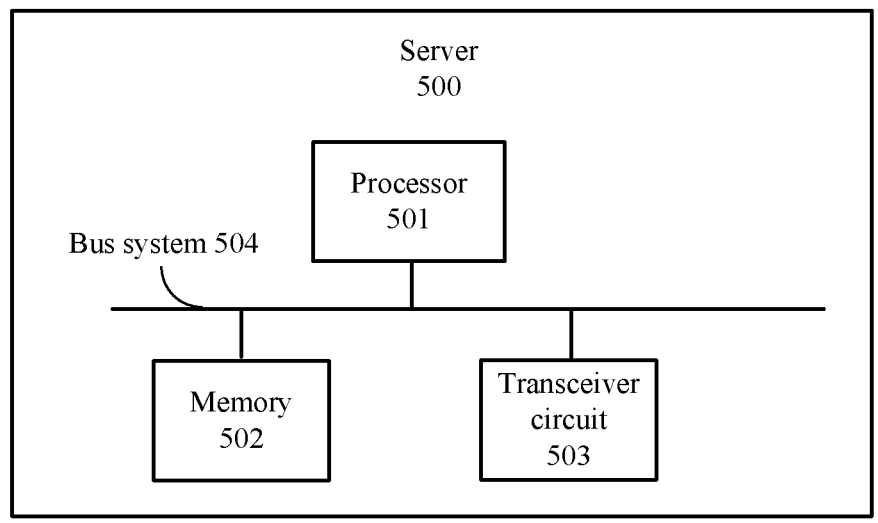
FIG. 5 is a structural block diagram of a server according to an embodiment of the present invention.

FIG. 5 is a structural block diagram of a server according to an embodiment of the present invention. The server 500 shown in FIG. 5 includes a processor 501, a memory 502, and a transceiver circuit 503. The server 500 may perform the steps performed by the server shown in FIG. 2 and FIG. 3.

The components of the server 500 are coupled together by using a bus system 504, where the bus system 504 includes a data bus, and may further include a power bus, a control bus, and a state signal bus. However, for clarity of description, the buses are marked as the bus system 504 in FIG. 5.

The methods disclosed in the foregoing embodiments of the present invention may be applied to the processor 501, or implemented by the processor 501. The processor 501 may be an integrated circuit chip that has a signal processing capability. In an implementation process, the steps of the foregoing methods may be performed by using an integrated logical circuit of hardware in the processor 501 or an instruction in a form of software. The processor 501 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or a transistor logical device, or a discrete hardware component. The methods, the steps, and the logical block diagrams disclosed in the embodiments of the present invention can be implemented or executed. The general-purpose processor may be a microprocessor, or the processor may be any conventional processor or the like. The steps of the methods disclosed in the embodiments of the present invention may be directly performed by a hardware decoding processor, or may be performed by a combination of hardware and a software module in a decoding processor. The software module may be located in a mature storage medium in the art, such as a random access memory (Random Access Memory, RAM), a flash memory, a read-only memory (Read-Only Memory, ROM), a programmable read-only memory, an electrically erasable programmable memory, or a register. The storage medium is located in the memory 502. The processor 501 reads an instruction from the memory 502, and performs the steps of the foregoing methods in combination with the hardware of the processor 501.

The transceiver circuit 503 is configured to receive travelling schedule information sent by a terminal device, where the travelling schedule information includes N travelling schedule nodes, and N is a positive integer greater than or equal to 1.

The processor 501 is configured to determine multiple traffic packages that are corresponding to the N travelling schedule nodes, where the multiple traffic packages are provided by an operator, and each of the multiple traffic packages is corresponding to at least one of the N travelling schedule nodes.

The transceiver circuit 503 is further configured to send information about the multiple traffic packages to the terminal device.

The transceiver circuit 503 is further configured to receive a traffic package subscription message sent by the terminal device, where the traffic package subscription message includes an identity of a target traffic package and identity information of the terminal device.

The transceiver circuit 503 is further configured to obtain, according to the identity of the target traffic package and the identity information of the terminal device, N profiles from the operator that provides the target traffic package, where the N profiles are corresponding to the N travelling schedule nodes in a one-to-one manner.

The transceiver circuit 503 is further configured to send the N profiles to the terminal device.

According to the server shown in FIG. 5, the terminal device may be incapable of directly communicating with an operator that provides a traffic package. Therefore, the server 500 is capable of sending, to a terminal device that needs to purchase a traffic package, traffic packages that can be provided by different operators, so as to help the terminal device determine a target traffic package that needs to be used.

The information about the traffic packages may include identities of the traffic packages, validity times of the traffic packages, total traffic of the traffic packages, and prices of the traffic packages. The identities of the traffic packages include index values of the traffic packages and identity information of the operator that provides services for the traffic packages. The information about the traffic packages may further include the identity information of the operator that provides services for the traffic packages. The identity information may further include geographic location information. For example, the identity information may be a public land mobile network (English: Public Land Mobile Network, PLMN for short), or location information coordinates obtained by using a positioning technology, such as the Global Positioning System (English: Global Positioning System, GPS for short). In this way, the terminal device may determine, according to the PLMN, a geographic location in which the traffic packages can be used.

Optionally, in an embodiment, the transceiver circuit 503 is further configured to: send a traffic package subscription response message to the terminal device, where the traffic package subscription response message includes a token, and the token is used to indicate the N profiles; and receive a download request message sent by the terminal device, where the download request information includes the token and identities of the N travelling schedule nodes. The transceiver circuit 503 is specifically configured to send a download request response message to the terminal device, where the download request response message includes the N profiles.

Optionally, in another embodiment, the transceiver circuit 503 is further configured to: send a traffic package subscription response message to the terminal device, where the traffic package subscription response message includes a token, and the token is used to indicate the N profiles; and receive a download request message sent by the terminal device, where the download request message includes the token and an identity or identities of one or more travelling schedule nodes of the N travelling schedule nodes. The transceiver circuit 503 is specifically configured to: send a download request response message to the access platform server, where the download request response message includes a profile or profiles corresponding to the one or more travelling schedule nodes; and continue to receive a download request message sent by the terminal device and send a download request response message to the terminal device, until the N profiles are sent to the terminal device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working procedure of the foregoing system, apparatus, and unit, reference may be made to a corresponding procedure in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, a network device, or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A traffic package providing method, comprising:
obtaining, by a terminal device supporting an embedded universal integrated circuit card (eUICC), travelling schedule information comprising multiple travelling schedule nodes, wherein each of the multiple travelling scheduling nodes corresponds to a different geographical region;
sending, by the terminal device, the travelling schedule information to an access platform server;
receiving, by the terminal device from the access platform server, information about a plurality of traffic packages corresponding to the multiple travelling schedule nodes, wherein each of the multiple travelling schedule nodes corresponds to information about at least one traffic package in the information about the plurality of traffic packages, and wherein the information about the plurality of traffic packages is provided by an operator;
determining, based on the information about the plurality of traffic packages, correspondences between the multiple travelling schedule nodes and respective traffic packages of the plurality of traffic packages;
setting, by the terminal device from the plurality of traffic packages, a target traffic package to be used by the terminal device in each of the multiple travelling schedule nodes;
sending, by the terminal device, a traffic package subscription message to the access platform server, wherein the traffic package subscription message comprises an identity of a set target traffic package and identity information of the terminal device;
obtaining, by the terminal device, N profiles corresponding to the multiple travelling schedule nodes in a one-to-one manner, wherein N corresponds to a number of the multiple travelling schedule nodes; and
installing, by the terminal device, the N profiles.

2. The method of claim 1, wherein the information about the plurality of traffic packages comprises identities, validity times, total traffic, and prices of the plurality of traffic packages, and wherein the identities comprise index values of the plurality of traffic packages and identity information of each operator providing services for the plurality of traffic packages.

3. The method of claim 2, wherein obtaining the N profiles comprises:
receiving, by the terminal device, a traffic package subscription response message from the access platform server, wherein the traffic package subscription response message comprises a token indicating the N profiles;
sending, by the terminal device, a download request message comprising the token to the access platform server; and
receiving, by the terminal device, a download request response message comprising the N profiles from the access platform server.

4. The method of claim 3, wherein the travelling schedule information further comprises N travelling schedule times corresponding to the multiple travelling schedule nodes in a one-to-one manner, and wherein installing the N profiles comprises:
sequentially installing, by the terminal device, the N profiles according to a quantity of profiles that can be installed on the eUICC according to a sequence of a travelling schedule time corresponding to each of the N profiles; and
deleting, by the terminal device, an invalid profile.

5. The method of claim 2, wherein the travelling schedule information further comprises N travelling schedule times corresponding to the multiple travelling schedule nodes in a one-to-one manner, and wherein obtaining the N profiles comprising:
receiving, by the terminal device, a traffic package subscription response message from the access platform server, wherein the traffic package subscription response message comprises a token indicating the N profiles;
sending, by the terminal device, a download request message to the access platform server, wherein the download request message comprises the token and an identity or identities of one or more travelling schedule nodes of the multiple travelling schedule nodes, and wherein the one or more travelling schedule nodes are one or more travelling schedule nodes whose travelling schedule time is earliest among travelling schedule nodes for which no corresponding profile has been obtained;
receiving, by the terminal device, a download request response message from the access platform server, wherein the download request response message comprises a profile or profiles corresponding to the one or more travelling schedule nodes; and
continuing, by the terminal device, to send the download request message to the access platform server and to receive the download request response message from the access platform server until the N profiles are obtained.

6. The method of claim 1, wherein before setting the target traffic package to be used by the terminal device in each of the multiple travelling schedule nodes, the method further comprises:
obtaining, by the terminal device, traffic requirement information indicating total traffic that needs to be used;
obtaining, by the terminal device, a network capability parameter of each operator providing the plurality of traffic packages; and
setting the target traffic package to be used by the terminal device in each of the multiple travelling schedule nodes by:
setting, by the terminal device from the plurality of traffic packages, a traffic package matching a network capability parameter of the terminal device as a candidate traffic package; and
setting, by the terminal device from the candidate traffic package, a candidate traffic package matching the traffic requirement information as the target traffic package.

7. The method of claim 1, wherein the travelling schedule information further comprises N travelling schedule times corresponding to the multiple travelling schedule nodes in a one-to-one manner, and wherein before setting the target traffic package to be used by the terminal device in each of the multiple travelling schedule nodes, the method further comprises:
obtaining, by the terminal device, traffic requirement information indicating total traffic that needs to be used;

obtaining, by the terminal device, a network capability parameter of each operator providing the plurality of traffic packages; and setting the target traffic package to be used by the terminal device in each of the multiple travelling schedule nodes by:

setting, by the terminal device from the plurality of traffic packages, a traffic package matching a network capability parameter of the terminal device as a candidate traffic package; and setting, by the terminal device from the candidate traffic package, a candidate traffic package matching the traffic requirement information and an $n^{th}$ travelling schedule time as a target traffic package in an $n^{th}$ travelling schedule node, wherein n=1, ... , N.

8. A traffic package providing method, comprising:

sending, by an access platform server, a traffic package subscription response message to a terminal device, wherein the traffic package subscription response message comprises a token indicating N profiles, and wherein N is greater than one;

receiving, by the access platform server, a download request message from the terminal device, wherein the download request message comprises the token and identities of N travelling schedule nodes;

sending the N profiles to the terminal device using a download request response message;

receiving, by the access platform server, travelling schedule information from the terminal device, wherein the travelling schedule information comprises N travelling schedule nodes, and wherein the N profiles correspond to the N travelling schedule nodes in a one-to-one manner;

determining, by the access platform server, a plurality of traffic packages provided by operators and corresponding to the N travelling schedule nodes, wherein each traffic package of the plurality of traffic packages corresponds to at least one of the N travelling schedule nodes;

sending, by the access platform server, information about the plurality of traffic packages to the terminal device;

receiving, by the access platform server, a traffic package subscription message from the terminal device, wherein the traffic package subscription message comprises an identity of a target traffic package and identity information of the terminal device;

obtaining, by the access platform server according to the identity of the target traffic package and the identity information of the terminal device, the N profiles from an operator providing the target traffic package; and sending, by the access platform server, the N profiles to the terminal device.

9. The method of claim 8, wherein the information about the plurality of traffic packages comprises identities of the plurality of traffic packages, validity times of the plurality of traffic packages, total traffic of the plurality of traffic packages, and prices of the plurality of traffic packages, and wherein the identities of the plurality of traffic packages comprise index values of the traffic packages and identity information of each operator providing services for the plurality of traffic packages.

10. A terminal device, comprising:

an embedded universal integrated circuit card (eUICC);

an application processor coupled to the eUICC and configured to obtain travelling schedule information comprising multiple travelling schedule nodes, wherein each of the multiple travelling scheduling nodes corresponds to a different geographical region;

a communications circuit coupled to the eUICC and the application processor and configured to:

send the travelling schedule information to an access platform server;

receive, from the access platform server, information about a plurality of traffic packages corresponding to the multiple travelling schedule nodes, wherein each of the multiple travelling schedule nodes corresponds to information about at least one traffic package in the information about the plurality of traffic packages, and wherein the information about the plurality of traffic packages is provided by an operator, wherein the application processor is further configured to:

determine, based on the information about the plurality of traffic packages, correspondences between the multiple travelling schedule nodes and respective traffic packages of the plurality of traffic packages; and set, from the plurality of traffic packages, a target traffic package to be used by the terminal device in each of the multiple travelling schedule nodes, wherein the communications circuit is further configured to:

send a traffic package subscription message to the access platform server, wherein the traffic package subscription message comprises an identity of a set target traffic package and identity information of the terminal device; and obtain N profiles corresponding to the multiple travelling schedule nodes in a one-to-one manner, wherein N corresponds to a number of the multiple travelling schedule nodes, and wherein the eUICC is configured to install the N profiles.

11. The terminal device of claim 10, wherein the information about the plurality of traffic packages comprises identities, validity times, total traffic, and prices of the plurality of traffic packages, and wherein the identities of the plurality of traffic packages comprise index values of the plurality of traffic packages and identity information of each operator providing services for the plurality of traffic packages.

12. The terminal device of claim 11, wherein the communications circuit is further configured to:

receive a traffic package subscription response message from the access platform server, wherein the traffic package subscription response message comprises a token indicating the N profiles;

send a download request message comprising the token to the access platform server; and receive a download request response message comprising the N profiles from the access platform server.

13. The terminal device of claim 12, wherein the travelling schedule information further comprises N travelling schedule times corresponding to the multiple travelling schedule nodes in a one-to-one manner, and wherein the eUICC is further configured to:

sequentially install the N profiles according to a quantity of profiles that can be installed on the eUICC of the terminal device according to a sequence of a travelling schedule time corresponding to each of the N profiles; and delete an invalid profile.

14. The terminal device of claim 11, wherein the travelling schedule information further comprises N travelling schedule times corresponding to the multiple travelling schedule nodes in a one-to-one manner, and wherein the communications circuit is further configured to:

receive a traffic package subscription response message from the access platform server, wherein the traffic package subscription response message comprises a token indicating the N profiles;

send a download request message to the access platform server, wherein the download request message comprises the token and an identity or identities of one or more travelling schedule nodes of the multiple travelling schedule nodes, and wherein the one or more travelling schedule nodes are one or more travelling schedule nodes whose travelling schedule time is earliest among travelling schedule nodes for which no corresponding profile has been obtained;

receive a download request response message from the access platform server, wherein the download request response message comprises a profile or profiles corresponding to the one or more travelling schedule nodes; and continue to send the download request message to the access platform server and to receive the download request response message from the access platform server until the N profiles are obtained.

15. The terminal device of claim 10, wherein the application processor is further configured to:

obtain traffic requirement information and a network capability parameter of each operator providing the plurality of traffic packages, wherein the traffic requirement information indicates total traffic that needs to be used;

set, from the plurality of traffic packages, a traffic package matching a network capability parameter of the terminal device as a candidate traffic package; and set, from the candidate traffic package, a candidate traffic package matching the traffic requirement information as the target traffic package.

16. The terminal device of claim 10, wherein the travelling schedule information further comprises N travelling schedule times corresponding to the multiple travelling schedule nodes in a one-to-one manner, and wherein the application processor is further configured to:

obtain traffic requirement information and a network capability parameter of each operator providing the plurality of traffic packages, wherein the traffic requirement information indicates total traffic that needs to be used;

set, from the plurality of traffic packages, a traffic package matching a network capability parameter of the terminal device as a candidate traffic package; and set, from the candidate traffic package, a candidate traffic package matching the traffic requirement information and an $n^{th}$ travelling schedule time as a target traffic package in an $n^{th}$ travelling schedule node, wherein $n=1, \ldots, N$.

* * * * *